(12) United States Patent
Fujita et al.

(10) Patent No.: US 7,812,499 B2
(45) Date of Patent: Oct. 12, 2010

(54) ARMATURE WINDING OF ELECTRIC ROTATING MACHINE, STATOR OF ELECTRIC ROTATING MACHINE AND ELECTRIC ROTATING MACHINE

(75) Inventors: Masafumi Fujita, Yokohama (JP); Tadashi Tokumasu, Tokyo (JP); Mikio Kakiuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/533,165

(22) Filed: Jul. 31, 2009

(65) Prior Publication Data

US 2009/0289518 A1 Nov. 26, 2009

Related U.S. Application Data

(62) Division of application No. 11/928,569, filed on Oct. 30, 2007, now Pat. No. 7,579,737.

(30) Foreign Application Priority Data

Nov. 10, 2006 (JP) ............................. 2006-305885

(51) Int. Cl.
*H02K 3/14* (2006.01)

(52) U.S. Cl. .................. 310/213; 310/179; 310/201; 310/260

(58) Field of Classification Search ......... 310/179–209, 310/213–215, 258–260
See application file for complete search history.

(56) References Cited

U.S. PATENT DOCUMENTS

| | | | |
|---|---|---|---|
| 1,144,252 A | 6/1915 | Roebel | |
| 2,821,641 A | 1/1958 | Ringland | |
| 3,118,015 A * | 1/1964 | Willyoung | 174/33 |
| 3,585,428 A * | 6/1971 | Bennington et al. | 310/213 |
| 3,602,751 A * | 8/1971 | Brenner et al. | 310/102 R |
| 3,614,497 A * | 10/1971 | Brenner | 310/213 |
| 3,647,932 A * | 3/1972 | Heller et al. | 174/34 |
| 3,825,783 A | 7/1974 | Duffert | |
| 4,191,903 A * | 3/1980 | Brenner et al. | 310/213 |
| 4,384,227 A * | 5/1983 | Kawai | 310/213 |
| 4,633,115 A | 12/1986 | Saitoh et al. | |
| 4,959,575 A * | 9/1990 | Saitoh et al. | 310/213 |
| 6,703,752 B2 | 3/2004 | Haldemann | |
| 7,312,552 B2 | 12/2007 | Fujita et al. | |
| 7,368,842 B2 * | 5/2008 | Hattori et al. | 310/213 |
| 7,459,825 B2 | 12/2008 | Haldermann | |
| 2006/0071573 A1 | 4/2006 | Fujita et al. | |

FOREIGN PATENT DOCUMENTS

| CN | 1767320 A | 5/2006 |
|---|---|---|
| JP | 2004-293051 | 10/2004 |

\* cited by examiner

*Primary Examiner*—Thanh Lam
(74) *Attorney, Agent, or Firm*—Oblon, Spivak, McClelland, Maier & Neustadt, L.L.P.

(57) ABSTRACT

An armature winding of an electric rotating machine is provided, which includes at least one armature winding bar composed of a plurality of element wire conductors, wherein the armature winding bar includes an element wire conductor configured to have twisted transposing angles of 180 degrees at one border zone and a middle zone in a winding slot and a twisted transposing angle different from 180 degrees at the other border zone of the winding slot of the element wire conductor.

3 Claims, 16 Drawing Sheets

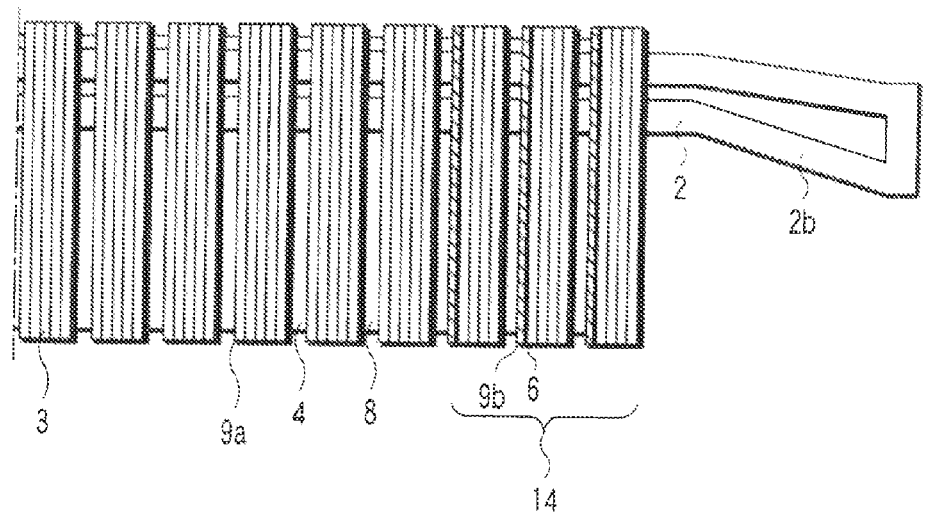
F I G. 18
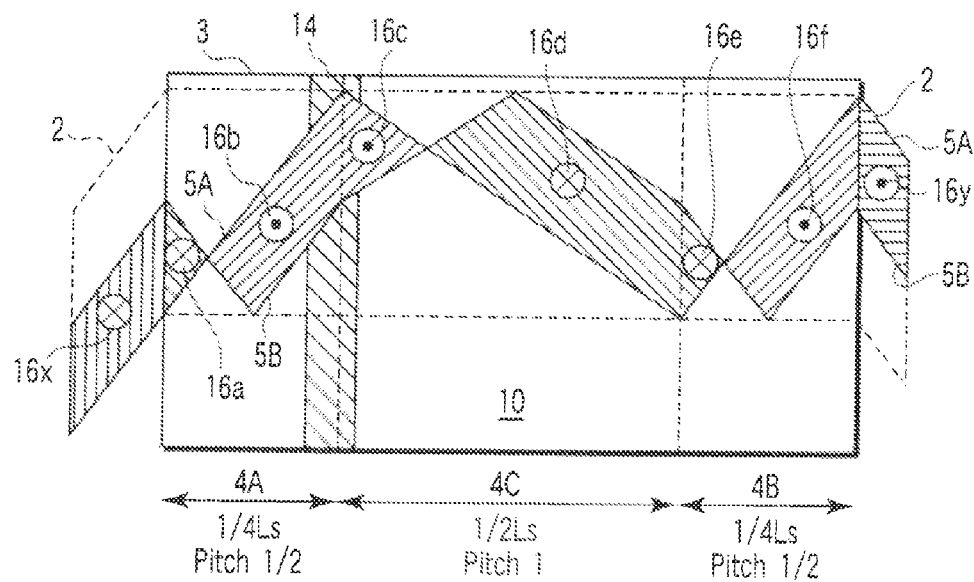
F I G. 19

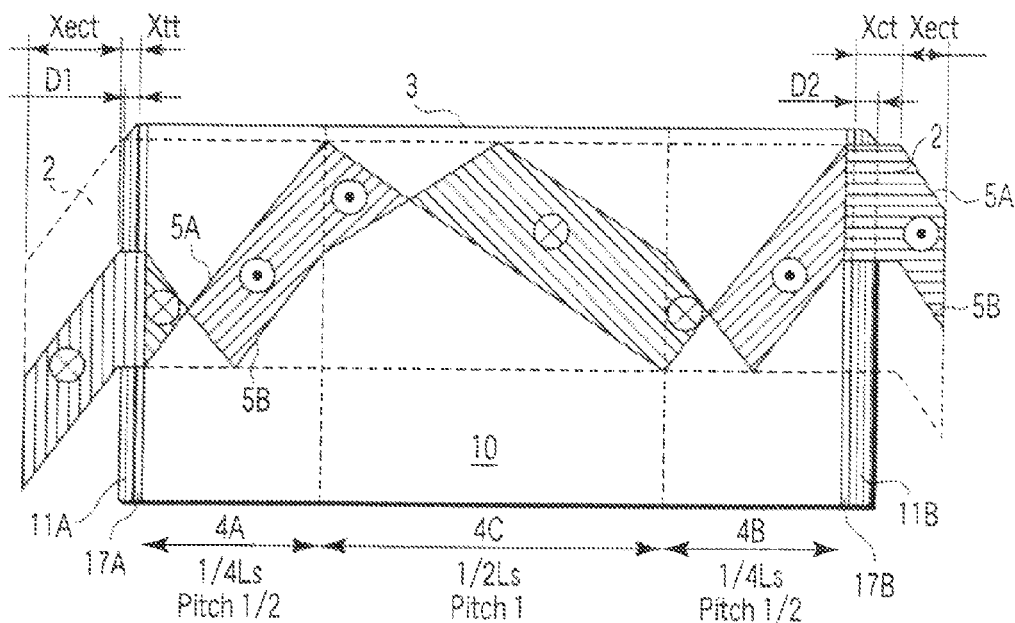
FIG. 24
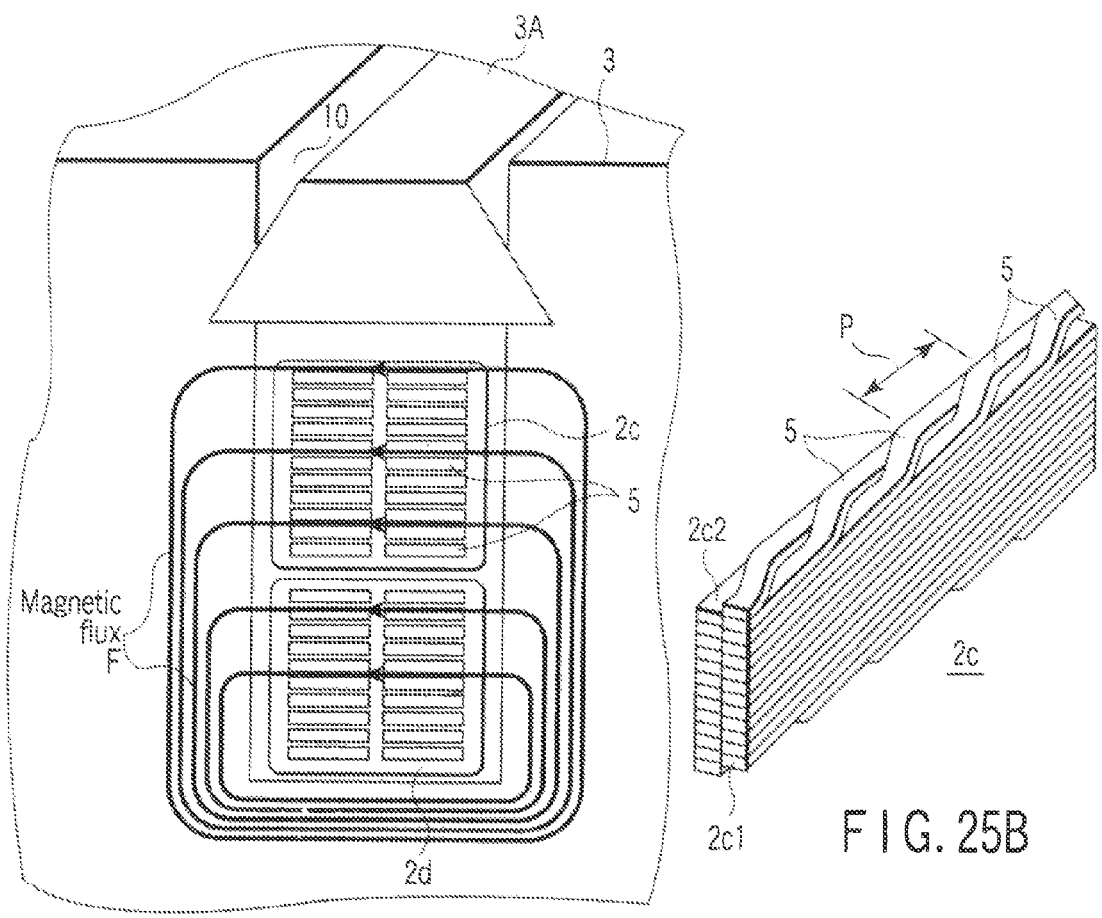
FIG. 25A
FIG. 25B

ARMATURE WINDING OF ELECTRIC ROTATING MACHINE, STATOR OF ELECTRIC ROTATING MACHINE AND ELECTRIC ROTATING MACHINE

CROSS-REFERENCE TO RELATED APPLICATIONS

This application is a division of and claims the benefit of priority under 35 U.S.C. §120 from U.S. Ser. No. 11/928,569 filed Oct. 30, 2007, and claims the benefit of priority under 35 U.S.C. §119 from Japanese Patent Application No. 2006-305885 filed Nov. 10, 2006, the entire contents of each of which are incorporated herein by reference.

BACKGROUND OF THE INVENTION

1. Field of the Invention

The present invention relates to an electric rotating machine, a stator of the electric rotating machine, and an armature winding of the electric rotating machine.

2. Description of the Related Art

A stator of an electric rotating machine is configured as shown in FIG. 25A. FIG. 25A is a sectional view showing a part of the stator of the electric rotating machine wherein a plurality of winding slots 10 are formed in the core 3 of the stator configured with a stacked iron plates and an armature winding 2 is mounted in each winding slot 10. The winding slots 10 are formed in the core 3 in a direction extending along a rotating axis of a rotor (not shown) and a plurality of ventilation ducts (not shown) are provided in a radial direction in the core 3. The armature winding 2 is stored in each winding slot 10.

The armature winding 2 stored in the slot 10 includes a top coil section 2c and a bottom coil section 2d, each of which is composed of a number of stacked strands or element wire conductors 5. Each of the coil sections 2c and 2d is composed of two columns 2c1 and 2c2 each includes a number of stacked conductors 5 as shown in FIG. 25B wherein a part of one coil section 2c is illustrated as an example. The coil sections 2c and 2d are held in the slot 10 by a wedge 3A at the opening part of the slot 10. As shown in FIG. 25B, the conductors 5 in the columns 2c1 and 2c2 are twisted along its lengthwise direction in the slot 10. When the conductors 5 are twisted with a transposing pitch P, the position of the conductor 5 is transposed at 360 degrees, for example, as a typical example between both ends of the slot 10. The other coil section 2d is configured in the similar manner.

Further, the element wire conductors 5 are short-circuited commonly at both side parts of the armature winding 2 to form a half coil having commonly connected end portions configured to protrude to the outside from both side ends of the slot 10 of the core 3, so that the element wire conductors 5 in the half coil are commonly connected in parallel.

In the case where an alternating current flows through multiple element wire conductors 5 in an electric power generator, for example, a leakage magnetic flux F crossing the winding slot 10 in a circumferential direction is generated as shown in FIG. 25A, whereby alternating voltages are induced in the element wire conductors 5. If very large voltages are induced between a pair of element wire conductors in the half coil, for example, a large circulation current, i.e., a current circulating along a closed loop circuit formed by an element wire conductor pair flows, and then, a current loss increases and heat generated inside the element wire conductor pair also increases.

Therefore, in order to substantially equalize the voltages induced in each of the element wire conductor pair so as to prevent the circulation current from flowing, each of the paired element wire conductors is transposed or twisted by such a variety of methods as disclosed in patent documents such as U.S. Pat. No. 1,144,252, 1915 issued to L. Roebel or U.S. Pat. No. 2,821,641, 1958 issued to W. L. Ringland.

Hereinafter, with reference to FIGS. 26 and 27, a description will be given with respect to the transposition method of the element wire conductors that is a conventional technique disclosed in the above patent documents. In transposing the element wire conductors, the element wire conductors are twisted along the longitudinal direction of a winding slot, whereby the positions of the element wire conductors are sequentially changed. In a cross section of the element wire conductors, assuming that a certain element wire conductor pair is rotated around the periphery of the sectional middle of the conductors, a degree of transposition is represented by an angle of the rotation around the longitudinal axis of the conductors. The transposition that a starting position of the element wire conductors at one end in the winding slot comes at a position identical to the starting position at the other end of the winding slot is referred to as a 360-degree transposition (refer to U.S. Pat. No. 1,144,252).

FIG. 26 is a schematic view representing an element wire conductor pair of the 360-degree transposition. One of the element wire conductor pair is shown in FIG. 26 as a conductor which is composed of five conductor sections 5a, 5b, 5c, 5d, 5x and 5y. The conductor sections 5a, 5b, 5c and 5d in the conductor 5 in the stator winding 2 are positioned in the active region or the winding slot 10 formed in the stator core 3 extending along a rotating axis of a rotor (not shown). The conductor in the conductor pair is twisted between the sections 5a and 5b and between the sections 5c and 5d in the winding slot 10 by 180 degrees, respectively, so that the conductor is transposed at 360 degrees in the winding slot 10. Both ends of the element wire conductor 5 shown as the sections 5x and 5y are extended outside the slot 10. Though not shown in the figure, the sections 5x and 5y are connected with corresponding end sections of another element wire conductor (not shown) in the conductor pair so that the conductor pair including the conductor 5 is connected in parallel with each other at both ends of a half coil of the armature winding 2 protruding to the outside from both sides of the slot 10 to form a closed circuit loop as a strand pair.

In the configuration shown FIG. 26 it is assumed that magnetic fluxes 16a to 16d interlink with the sections 5a to 5d of the conductor 5 in the slot 10. In the figure, the magnetic flux 16a interlinks the section 5a, the fluxes 16b and 16c interlink the section 5b and 5c, and the flux 16d interlinks the section 5d. Fluxes 16x and 16y also interlink the outside sections 5x and 5y of the conductor 5, respectively. At an instant period of time, the fluxes in the figure interlink in the normal direction to the drawing paper in one direction. When the conductor 5 is twisted by 180 degrees, the symbol "x" in the circle shown in the figure denotes the orientation of the fluxes passing from the top to back surface of the drawing paper and the symbol "." in the circle denotes the orientation from back to top surface of the drawing paper. The magnetic fluxes 16a to 16d and 16x and 16y are generated at a moment at which a given current has flowed through the twisted element wire conductor 5 so as to denote directions of the induced voltages caused by the current flowing through the sections 5x to 5y of the conductor 5. For example, in FIG. 26, a configuration is given such that an absolute value of the sum of fluxes 16a and 16d is equal to that of the fluxes 16b and 16c, so that the induced voltages in the sections 5a and 5d are canceled by the induced voltages in the section 5b and 5c in the winding slot 10.

However, although a 360-degree transposition is applied in the conductor positioned in the winding slot 10 as disclosed above, no transposition is performed outside of the winding slot 10 with respect to the sections 5x and 5y in the conductor 5. Therefore, unbalanced voltages will be generated by means of leakage magnetic fluxes 16x and 16y at the both end parts outside the stator core 3, and a circulation current will be generated in the closed circuit formed by the element wire conductor 5 and another conductor (not shown) connected in parallel with the conductor 5 at both ends thereof forming a conductor pair.

As has been described above, the leakage magnetic fluxes 16x and 16y exist at the external of the stator core 3, whereby unbalanced voltages are induced to the end parts of the winding conductor 5 as well as the end parts of the conductor connected in parallel to the conductor 5, a circulation current flows in the closed circuit formed by the element wire conductor pair, and then, a current loss occurs. In order to reduce this loss, the positions of the element wire conductor 5 at both ends thereof should be transposed by 180 degrees, so that the directions of voltages induced at both end sections 5x and 5y of the same element wire conductor 5 are opposed, whereby they may be canceled or offset. This can be achieved by making the element wire conductor pair a 540-degree transposition in the winding slot 10, i.e., making the element wire conductor pair 5 a transposition of one rotation and a half, namely a 540-degree transposition (refer to U.S. Pat. No. 2,821,641), provided that the leakage flux 16x is equal to the flux 16y. Now, the 540-degree transposition will be described by referring to FIG. 27.

FIG. 27 is a schematic view representing an element wire conductor pair of a 540-degree transposition. Like constituent elements of FIG. 26 are designated by like reference numerals, and a duplicate description is omitted here in FIG. 27.

In FIG. 27, transposing pitches in two ranges of ¼Ls of the core length Ls on both side regions of the stator core 3 (left side core border zone and right side core border zone) are the half of the range of ½Ls of a core length Ls of the winding slot 10 in the core 3. Namely, the transposing pitch of the middle zone is 1, whereas the transposing pitches in the core border zones are ½, and a 180-degree transposition is made at each one of both border zones 4A, 4B and the middle zone 4C of the core 3. A sum of the interlinking magnetic fluxes 16a and 16e in the element wire conductor sections 5a and 5e included in the border zones 4A, 4B is equal to the flux 16c in the section 5c included in the middle zone 4C, and a sum of fluxes 16b and 16f in the sections 5b and 5f in the border zones 4A, 4B is equal to the flux 16d in the section 5d in the middle zone 4C, and thus, the inductive voltages induced in the conductor sections 5a to 5f positioned in the winding slot 10 are offset. In addition, in the outside of the winding slot 10, the voltages induced by the magnetic fluxes 16x and 16y interlinking with the outside sections 5x and 5y also offset, respectively, so that the circulation current exerted by the leakage magnetic fluxes at the end parts of the conductor 5 can also be reduced or minimized in the closed circuit formed by a conductor pair including the conductor 5.

With respect to the armature winding and a field winding of an electric rotating machine, since each conductor 5 forming the armature coil 3 is coated with an insulation material, an upper limit of a temperature is strictly limited by the heat resistance performance of the insulation material used for configuring these winding conductors. In designing the electric rotating machine, it is necessary to make a design so that these temperatures are maintained at or below the rated value.

In the conventional technique described above, when the transposing angle of the element wire conductors shown in FIG. 27 is set at 540 degrees, in the case where the leakage magnetic fluxes at both end sections 5x and 5y are equal to each other, the induced voltages generated at both ends of the element wire conductor pair are offset ideally. However, in the case where the amount of the magnetic fluxes interlinking the element wire conductor pair at both end sections 5x and 5y are different from each other, the inductive voltages induced at the end sections external to the core 3 cannot be completely offset. Examples of the cases are shown below.

For example, as shown in FIG. 28, lengths Xc and Xt of coil end parts extending in an axial direction from side ends of the stator core 3 are different from each other. Further, as shown in FIG. 29, a half coil 2c of the armature winding 2 protruding from a left end of a first slot of the stator core 3 is connected with another half coil 2d which is held in a second slot of the stator core 3 and, the other end of the half coil 2d protruding from the other end of the core 3 is connected to further half coil 2e which is held in a third slot which is different from the first slot in which the half coil 2c is held. Thus, a distance βc between the second and third slots in the right side of the half coils 2d and 2e is shorter than the distance βt between the first and second slots in the left side of the core 3.

In the case of FIG. 29, the third slot in which the half coil 2e enters may be a near slot close from the first slot in which the half coil 2c is held in the right side and the distance between the slots may be separated by two or more slots. The distance between the slots may be determined depending on connection of the coils of the armature winding, and the lengths of the end part of the coils outside the slot of the core 3 are different from each other. This fact causes the quantities of magnetic fluxes incident to the end part of the coils protruding outside the core 3 to be different between the one connection side and the other connection side of the armature winding 2.

In addition, as schematically shown in FIG. 30, at a connection part outside the slot 10 of the core 3, because of a connection from a load terminal of the electric rotating machine to a connection terminal of the armature winding or a connection terminal with an external parallel circuit, the element wiring conductors 5 of the armature winding 2 are connected to a connection copper band 12. A current flows also in this connection copper band 12, and thus, a magnetic flux is generated. If this externally generated magnetic flux is incident to the end part sections of the conductors 5, an interlinking magnetic flux 16x at the left side and an interlinking magnetic flux 16y at the right side cannot be offset completely.

FIG. 31 shows an example of a distribution of a loss that occurs in the twisted element wire conductors of a turbine power generator, the loss being obtained by means of numeric analysis. The figure shows examples of loss distributions in a case in which the interlinking magnetic flux quantities at both ends of the conductors are equal to each other (shown by a dashed line) and in a case in which the interlinking magnetic flux quantities at both ends are different from each other (shown by a solid line). It is found that, in the case where the flux quantities are different at both ends, a maximum value of an element wire loss increases as shown by the solid line because an unbalanced voltage is generated between element wire conductors and a circulation current flows. How much the maximum value of the element wire conductor loss increases depends on a design such as a structure of an electric rotating machine or a level of a current flowing in the winding of the electric rotating machine. In addition, the magnetic flux levels incident to the end part sections of the conductors are different from each other even between top and bottom coils as shown in FIG. 25, and thus, losses are different from each other. Further, the difference may occur also depending on the peripheral position of an armature-winding bar.

If the quantities of the interlinking magnetic fluxes incident to the element wire conductors at both end parts of the element wiring conductors are thus different from each other, the inductive voltages induced in the element wire conductors are not completely offset, a circulation current flows in the element wire conductor pair, and a loss occurs, thereby causing local overheat or lowered efficiency in the electric rotating machine.

BRIEF SUMMARY OF THE INVENTION

A first aspect of the present invention provides an armature winding of an electric rotating machine, comprising at least one armature winding bar composed of a plurality of element wire conductors, in each of a plurality of winding slots provided in a stator core, at least one of the element wire conductors being formed so as to be twisted and transposed along an extension direction of the winding slot, the element wire conductors being short-circuited at both ends protruding outside from both side ends of the stator core, wherein the armature winding includes the armature winding bar in which transposing pitches in the element wire conductor provided in the winding slot are different from each other between a proximity of both ends and a middle zone of the winding slot, transposing angles of a proximity of one end and the middle zone of the conductor in the winding slot are both set at 180 degrees, and a transposing angle of a proximity of the other end of the conductor in the winding slot is set to be different from 180 degrees.

A second aspect of the present invention provides a stator of an electric rotating machine, comprising a stator core provided with a plurality of ventilation ducts in a radial direction and a plurality of winding slots in an axial direction; and an armature winding in which at least one armature winding bar is mounted in one of the winding slots, the bar being composed of a plurality of element wire conductors stacked in the winding slot, at least one of the element wire conductors being formed so as to be twisted and transposed along an extension direction of the winding slot, the element wire conductors being short-circuited at both ends protruded outside from both side ends of the stator core, transposing pitches of the portion of the element wire conductor enclosed in the winding slot being different from each other at a proximity of both ends and at a middle zone of the winding slot, a total transposing angle being approximately 540 degrees, wherein a subsidiary core portion including a portion having a different core space factor is provided so as to reduce an unbalanced voltage generated at both ends of the element wiring conductor due to a difference in magnetic fluxes interlinking at the element wire conductor.

A third aspect of the present invention provides a stator of an electric rotating machine, comprising a stator core provided with a plurality of ventilation ducts in a radial direction and a plurality of winding slots in an axial direction; and an armature winding including a plurality of armature winding bars each composed of a plurality of element wire conductors stacked in each of the winding slots, at least one of the element wire conductors being formed so as to be twisted and transposed along an extension direction of the winding slots at a portion in the winding slot, the element wire conductors being short-circuited at both ends protruding outside from both side ends of the stator core, transposing pitches of the portion provided in the winding slot being different from each other at the proximity of both border zones and a middle zone of the winding slot, an entire transposing angle being approximately 540 degrees, wherein the armature winding bar includes portions protruding from both ends of the winding slot with different lengths so as to reduce an unbalanced voltage generated in the element wire conductor at both ends thereof due to a difference in magnetic fluxes interlinking the element wiring conductor.

A fourth aspect of the present invention provides a stator of an electric rotating machine, comprising a stator core provided with a plurality of ventilation ducts in a radial direction and a plurality of winding slots in an axial direction; and an armature winding having at least one armature winding bar composed of a plurality of element wire conductors stacked in a winding slot, one of the element wire conductors being formed so as to be twisted and transposed along an extension direction of the winding slot, the element wire conductors being short-circuited at both sides protruding outside from both side ends of the stator core, transposing pitches of the element wire conductor provided in the winding slot being different from each other between a proximity of both border zones and a middle zone of the winding slot, an entire transposing angle being substantially 540 degrees, wherein, at an end portion of the stator core in an axial direction thereof which is more outside than a portion at which a transposing of the element wire conductor is performed, a subsidiary core portion is provided so as to reduce an unbalanced voltage generated between the element wire conductors, the voltage being generated at both ends of the armature winding due to a difference in magnetic fluxes interlinking at the element wire conductor.

According to a further aspect of the present invention, there is provided an armature winding of an electric rotating machine, a stator of the electric rotating machine, and the electric rotating machine capable of reducing a circulation current in a closed circuit formed of the element wire conductors exerted by a difference in magnetic flux interlinking to the element wiring conductors and capable of suppressing an increase in loss and local overheat of the armature winding.

BRIEF DESCRIPTION OF THE SEVERAL VIEWS OF THE DRAWING

FIG. 18 is a partial sectional view of a stator in modification 4 of the third embodiment of the present invention;

FIG. 19 is a partial sectional view of a stator in modification 5 of the third embodiment of the present invention;

FIG. 24 is a view showing a basic structure of a part of a modification 2 of a stator in the electric rotating machine according to the fifth embodiment of the present invention;

FIG. 25A is a perspective view showing a part of a stator of an electric rotating machine having a slot provided with an armature winding from which leak magnetic fluxes are generated;

FIG. 25B is a perspective view showing a part of the coil section including twisted conductors shown in FIG. 25A;

DETAILED DESCRIPTION OF THE INVENTION

Hereinafter, with reference to the accompanying drawings, a description will be given with respect to embodiments of an armature winding of an electric rotating machine, a stator of the electric rotating machine and the electric rotating machine according to the present invention.

First Embodiment

Figure 1:
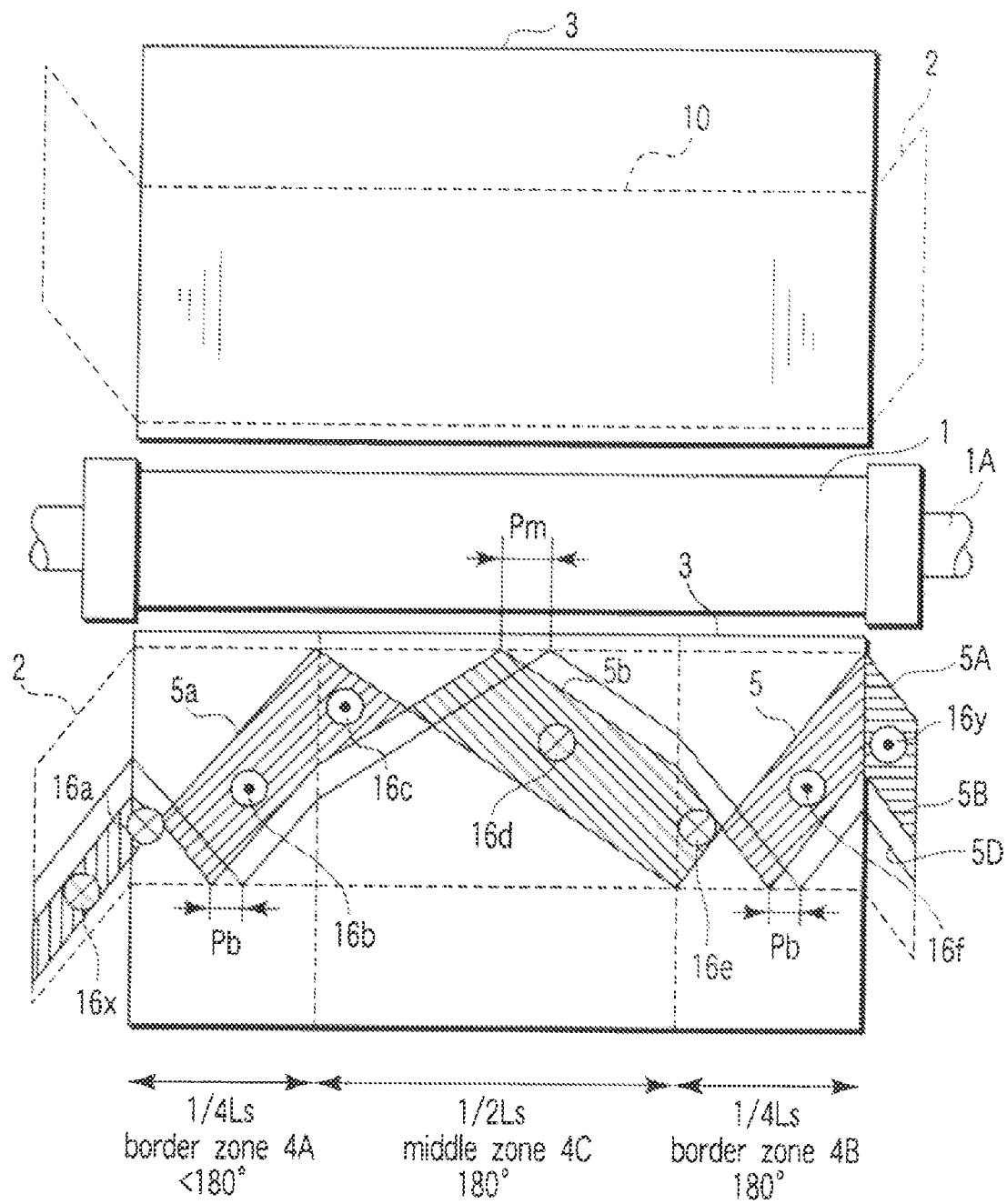
FIG. 1 is a view for explaining a basic structure of the first embodiment according to the present invention.

First, a first embodiment will be described with reference to FIG. 1. The configuration of the electric rotating machine according to the first embodiment of the present invention is shown in FIG. 1, which is composed of: a rotor 1; a stator core 3 having a plurality of winding slots 10 extending along a rotating axis of the rotor 1; and an armature winding 2 embedded in the winding slots 10. The armature winding 2 is equipped with at least one armature winding bar composed of a number of stacked element wire conductors or strands. For example, as shown in FIG. 25A, the armature winding bar is composed of top coil unit 2c and bottom coil unit 2d stacked in the slot 10 having a wedge 3A provided at an opening of the slot 10 for holding the coil units 2c and 2d in the slot 10.

In the embodiment of FIG. 1, Three strands or conductors 5A, 5B and 5D provided in the armature winding 2 are continuously twisted along the extension direction in the stator core 3 at portions provided in the winding slot 10, so that the element wire conductor pair formed of the twisted conductors 5A and 5B are short-circuited at both ends of the armature winding 2 protruding to the outside from both side ends of the stator core 3. The transposition pitch between the two twisted conductors 5B and 5D is set as Pm in the middle zone 4C and Pb in the border zones 4A and 4B.

Assuming that both ends of the conductor 5A in the armature winding 2 are different from each other in magnetic flux quantity interlinking the element wire conductor 5A. Further, in FIG. 1, it is assumed that the leakage magnetic flux quantity interlinking the conductor 5A at the right end part of the stator core 3 is smaller than that at the left end part. In order to denote this quantity relationship in the figure, the length of the end part of the conductor 5A at the right side is assumed to be short schematically. Therefore, the figure does not represent an actual difference in length of the end parts of the conductor 5A but represents the difference between quantities in the interlinking fluxes at both sides external of the core 3.

In the element wire conductor 5A, assuming that the length in the axial direction of the slot 10 in the stator core 3 is Ls, a 180-degree transposition or twist is made in the range of ¼Ls (core border zone 4B) near the right end of the stator core 3 of FIG. 1, and further, a 180-degree transposition is made in the range of ½Ls of the core middle zone 4C. Further, a transposition angle A in the range of ¼Ls (core border zone 4A) near the left end of the stator core 3 of FIG. 1 is smaller than 180 degrees, and, for example, an angle of 170 degrees is set. This transposition angle A takes a discontinuous value because the transposition in an element wire conductor is carried out by every few numbers of stacked conductors 5.

In the thus configured first embodiment, a current flows in the armature winding 3 at the time of loaded operation of the electric rotating machine, and the current branches and flows through element wire conductors to generate leakage fluxes interlinking the ends of the conductors 5A, 5B. FIG. 1 shows magnetic fluxes 16a, 16b, 16c, 16d, 16e, 16f, 16x, and 16y interlinking with regions formed of element wire conductors 5A and 5B. In fact, several tenth conductors 5 are stacked in the slot 10, and connected in parallel at both ends of the conductors in a half coil of the armature winding 2. It is assumed that one end of a conductor included in the stacked element wire conductors is positioned in the innermost diameter side near the rotor 1 at the right end part of the core 3 in FIG. 1 and another conductor in the stacked element wire conductors is positioned at the middle part in the vertical direction in the slot 10 at the right end part of the core 3 in FIG. 1. In the case where the interlinking magnetic flux for the armature winding 2 at the right end part of the stator core 3 is smaller than the interlinking magnetic flux at the left side of the stator core 3, the magnetic flux quantity oriented upward of the drawing paper is smaller than the magnetic flux quantity oriented downward of the drawing paper in the conventional 540-degree transposition method. However, a transposing angle is smaller than 180 degrees in the proximity of the left border zone 4A of the stator core 3 in the FIG. 1 embodiment, the quantity of the interlinking magnetic flux 16a is decreased while the flux 16b is maintained. In addition, the quantity of the interlinking magnetic flux 16x in the left border zone is also decreased in the case of the conventional 540-degree transpose, and the overall unbalance in the interlinking magnetic flux quantity is mitigated. In this manner, unbalanced voltages generated in a short-circuited element wire conductor pair decreases, and the generation of a circulation current loss can also be suppressed. While a description has been given here by way of a typical element wire conductor pair, an unbalanced voltage can be reduced similarly in other element wire conductor pair in the stacked conductors provided in the armature winding 2 held in the slot 10 in the stator core 3.

According to the first embodiment, an unbalanced voltage is reduced in the entire element wire conductors enclosed in the stator core 3, the generation of a circulation current is suppressed, and a circulation current loss can be reduced. Thus, a loss in each of the element wire conductor pair is reduced and a loss distribution in the element wire conductors is reduced, and further, local heating of the conductors of the armature winding can be suppressed.

Figure 2:
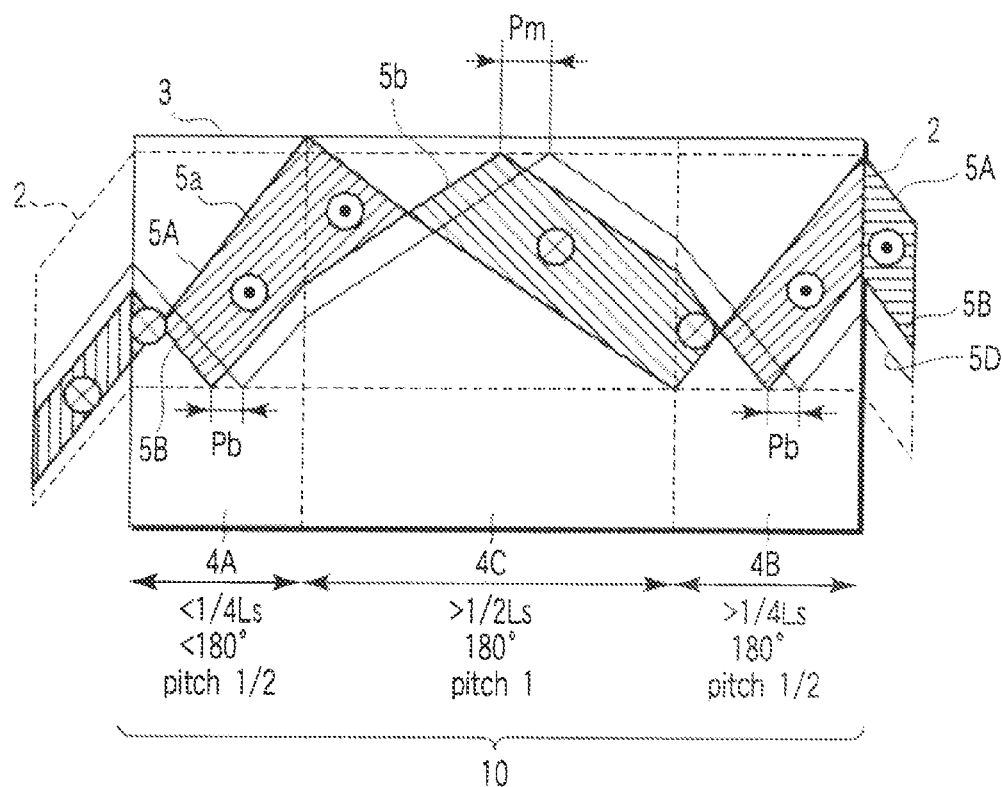
FIG. 2 is a view for explaining an exemplary modification of the basic structure of the first embodiment according to the present invention.

FIG. 2 shows a modification of the first embodiment shown in FIG. 1. Like constituent elements in FIG. 1 are designated by like reference numerals, and a description thereof is omitted. While FIG. 1 shows a schematic configuration of the entirety of the electric rotating machine including the stator 3 and the rotor 1, FIG. 2 shows only a part of the stator 3. FIGS. 7, 8, 12, 13, 15, 16, 17, 18, 19, 20, 22, 23, and 24 show the stator 3 in the similar manner as in FIG. 2.

In the embodiment of FIG. 1, points at which a transposition pitch of the element wire conductor changes (point of inflection) are set at the same positions of ¼Ls from the stator core both ends, as shown in the figure. In the modification of FIG. 2, a pair of the element wire conductors 5A and 5B are configured so that the ratios of the transposition pitches between the pitches Pb in the border zones 4A, 4B at both ends and a pitch Pm in the middle zone 4C are set to be equal to each other. In other words, in the case of FIG. 1, the transposition pitches of the element wire conductors are set to be of three types: assuming that the pitch is 1 at the middle zone 4C, the pitch is 0.5 at the right side border zone 4B, and between 0.5 and 1 at the left side border zone 4A. In the case of FIG. 2, there are only two types: one is a pitch (pitch 1) in the middle zone 4C and the other is that (pitch ½) in each of the border zones 4A and 4B. In this manner, the position of the inflection point of the transposition pitches is more middle side than ¼Ls from an end of the right side border zone 4B of the stator core 3, and is more end part side than ¼Ls from a left side border zone 4A, so that the unbalanced voltage reducing function at an element wire conductor pair 5A, 5B in the case of FIG. 2 is similar to that of FIG. 1.

Figure 3:
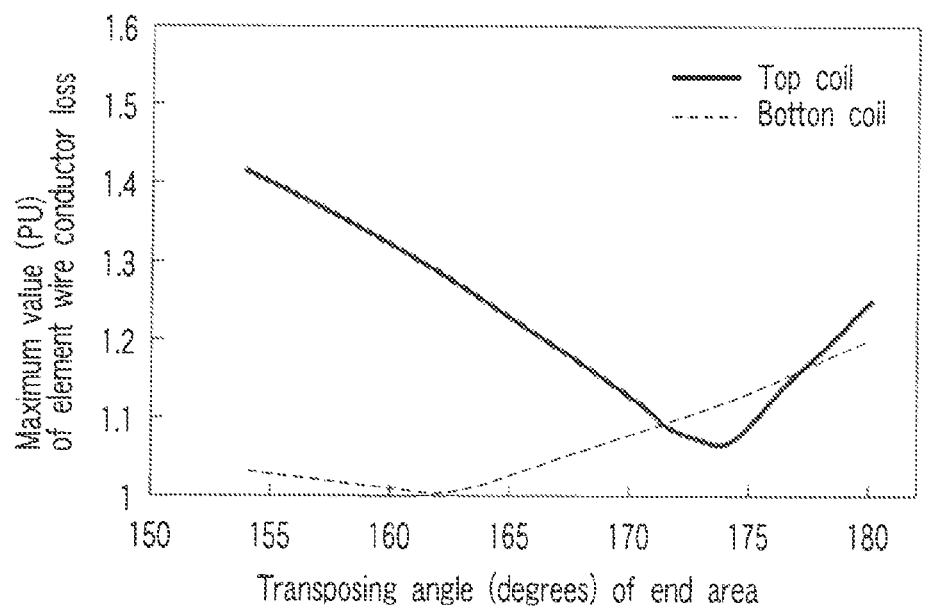
FIG. 3 is a view obtained by plotting maximum values of losses in an element wire conductor while a transposing angle of the conductor at an core border zone 1 is set as a parameter in the first embodiment of the present invention.

FIG. 3 is a view showing a relationship between a transposing angle and a maximum loss value (denoted by PU: per unit) in the element wire conductor in the proximity of left side part (core border zone 4A) of the stator core 3 of FIG. 1. The figure shows the relation with respect to each one of the top coil 2c and the bottom coil 2d shown in FIG. 25. Specifically, in FIG. 3, in the case where a magnetic flux difference between both ends of the stator core 3 is 0.3 PU, and the transposing angle in the core border zone 4A is set as a parameter, the maximum loss values of the element wire conductors are plotted. As shown by the solid line in FIG. 3, the loss in the top coil 2c is minimized at a transposing angle of 174 degrees (entirely 534 degrees) in the core border zone 4A, and in the bottom coil 2d, the loss is minimized at a transposing angle of 162 degrees in the core border zone 4A as shown by the dashed line in the figure. The reason why the transposing angle of minimizing the loss is smaller in the bottom coil 2d is that the magnetic flux quantity interlinking in the slot 10 is small in the bottom part of the slot 10, and thus an induced voltage is small.

Figure 4:
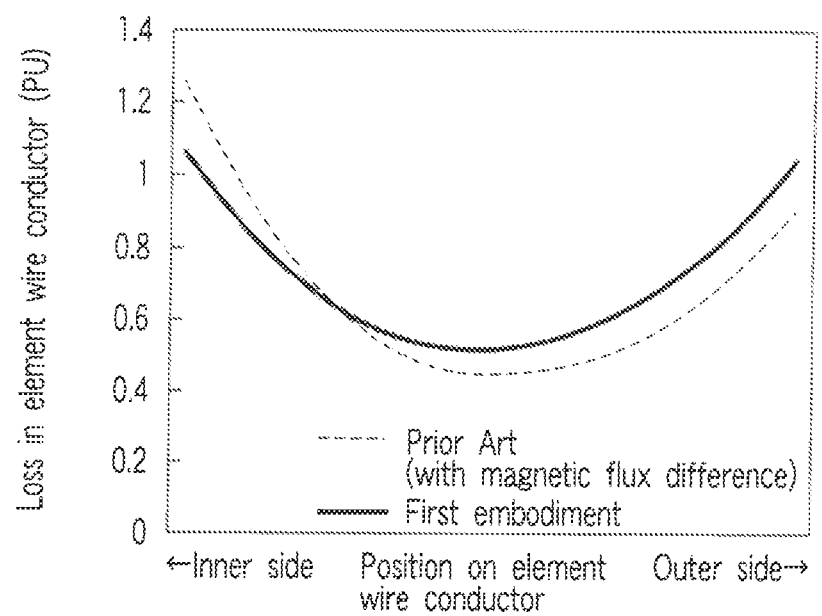
FIG. 4 is a view showing a loss distribution of an element wire conductor in the first embodiment of the present invention and a loss distribution of an element wire conductor of a 540-degree transposition of a prior art.
Figure 30:
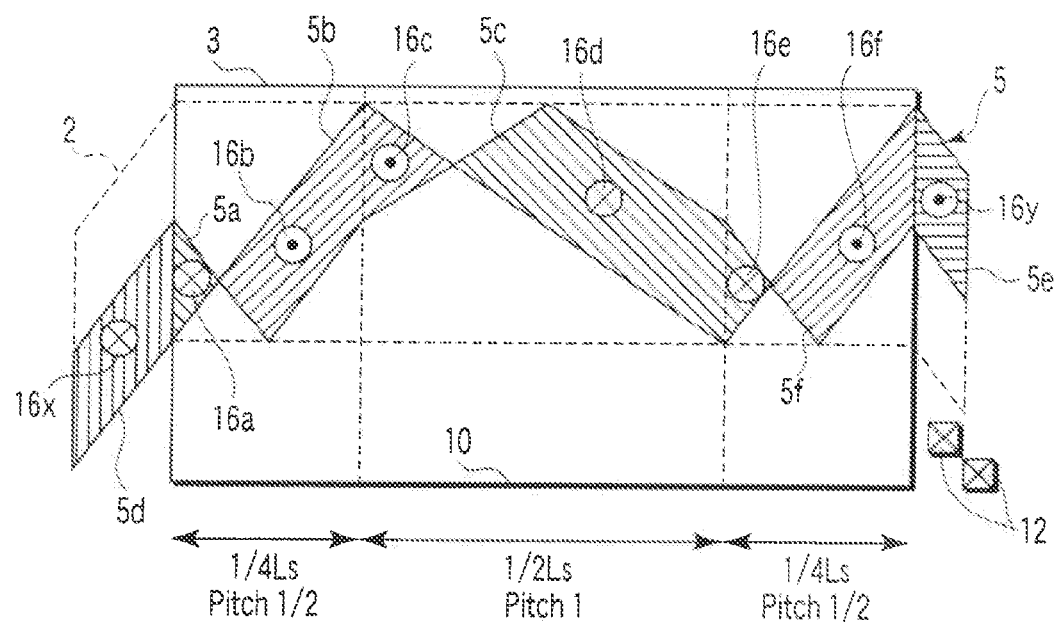
FIG. 30 is a basic structural view for explaining a case of a 540-degree transposition in the stator of the prior art electric rotating machine.
Figure 31:
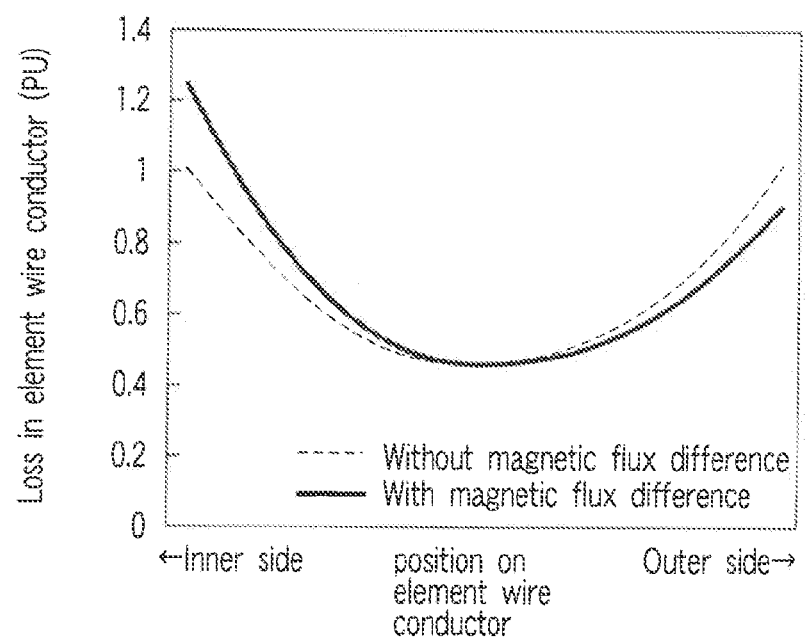
FIG. 31 is a view showing a comparison of a loss distribution in an element wire conductor by way of a numeric analysis in a case in which left and right magnetic fluxes at both ends of the stator of the electric rotating machine of FIG. 30 are equal to each other and in a case in which the left and right magnetic fluxes are different from each other.

FIG. 4 shows loss distribution curves in which a loss distribution in the element wire conductors according to the first embodiment described previously (in the case of the transposing angle of 175 degrees in the core border zone 4A) is compared with the case of the 540-degree transposition in the conventional technique, by means of a numeric analysis performed in the similar manner as in the case of FIGS. 30 and 31. As shown in FIG. 4, the solid line curve shows the loss distribution according to the present embodiment in which the flux difference at the both ends of the core appears. The loss distribution curve shown by the solid line in FIG. 4 is apparently similar to that of the dashed line shown in FIG. 31 in the case where no difference in the flux quantity at the both ends of the core 3 appears.

Thus, even in a case where the leakage magnetic flux quantity difference appears at both ends of the core 3, the shape of the loss distribution curve shown by the solid line according to the embodiment becomes substantially identical to that of dashed line shown in FIG. 31 showing a case in which no leakage magnetic flux quantity difference appears, while the maximum value of the loss is also set at a substantially similar value.

Figure 5:
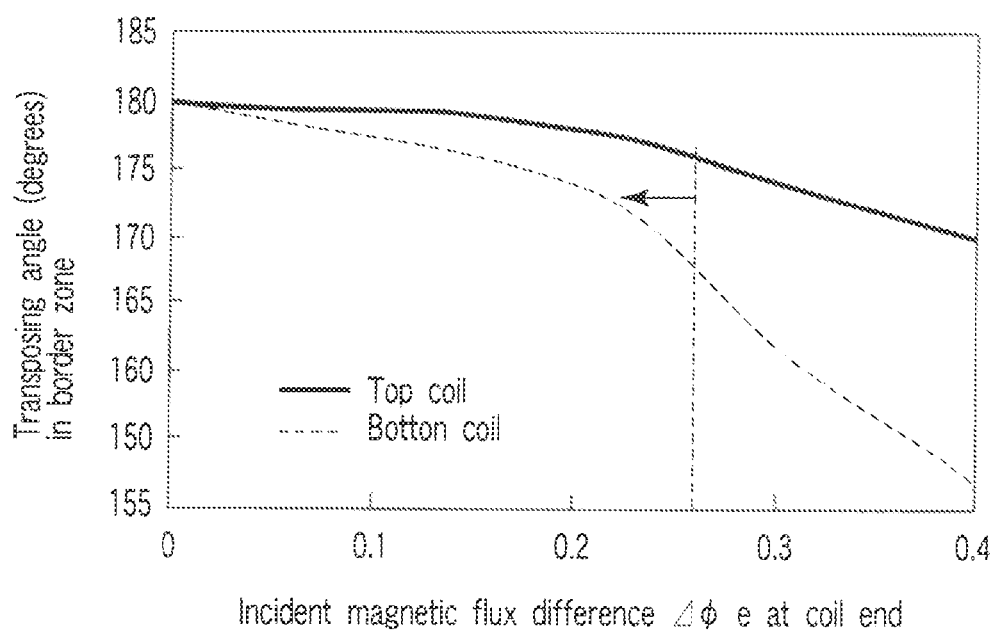
FIG. 5 is a view showing a relationship between an incident magnetic flux difference between coil end parts and a transposing angle of the core border zone 1 by way of a numeric analysis in the embodiment of FIG. 1 of the present invention.

FIG. 5 shows that an incident magnetic flux difference ΔΦe between coil end parts of the stator core 3 in the embodiment of FIG. 1 (in the case where the transposition pitches in the border zones at both ends of the stator core 3 are different from each other) is taken on the abscissa and a transposing angle in the core border zone 4A in which the loss maximum value in the element wire conductor becomes minimal is taken on the ordinate.

Figure 6:
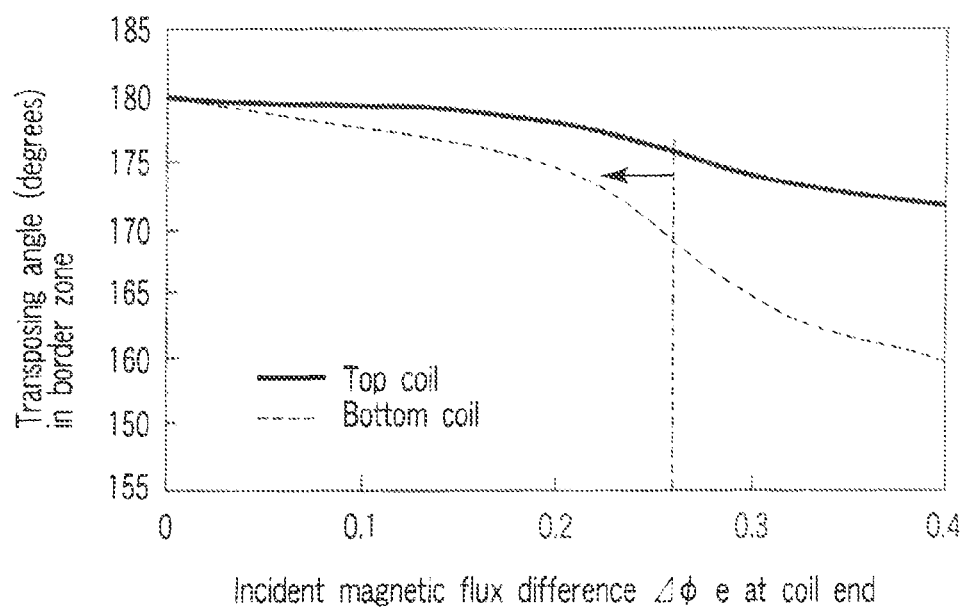
FIG. 6 is a view for explaining a transposing angle at which a maximum loss value in an embodiment of FIG. 21 of the present invention becomes minimal by way of a numeric analysis.

FIG. 6 shows that an incident magnetic flux difference ΔΦe between coil end parts of a stator in the embodiment of FIG. 2 (in the case where the transposition pitches in the border zones at both ends of the stator core 3 are identical to each other) is taken on the abscissa and a transposing angle of the core border zone 4A in which the loss maximum value in the element wire conductor becomes minimal is taken on the ordinate.

As can be seen from FIG. 5, the optimal transposing angle in the core border zone 4A changes depending on the incident magnetic flux difference between both ends of the core 3, and it is suggested that the optimal transposing angle in the top coil 2c is different to that in the bottom coil 2d.

In FIGS. 5 and 6 both, the greater the incident magnetic flux difference is, the smaller the optimal transposing angle is. In addition, the optimal transposing angles are different between the top coil and the bottom coil.

Although a difference in the incident magnetic fluxes between both ends depends on a variety of design conditions or operating conditions of the electric rotating machine, the difference can be in the range equivalent to 0 to 0.3 of the incident magnetic flux difference $\Delta\Phi e$ of the present embodiment in an electric rotating machine such as a turbine-driven electric power generator. Thus, when the transposing angle A in the border zone 4A is in the range of 160 degrees<A<180 degrees, the unbalanced voltage can be well reduced.

As shown in FIGS. 5 and 6, the transposing angle at which the loss maximum value can be minimized is different between the top coil and the bottom coil in the slot of the core 3. Thus, the above transposing angle $\theta$ is separately configured for each of the top coil and the bottom coil, thereby making it possible to reduce a loss more efficiently.

In addition, a ratio of incident magnetic fluxes at both ends of the core 3 can be determined by performing numeric analysis at the time of designing of the electric rotating machine. Further, the ratio is different depending on a positional relationship between each of the element wire conductors and a connection copper band. Thus, the magnetic flux quantity incident to the element wire conductors is obtained by means of detailed numeric analysis, thereby making it possible to determine a twisting or a transposing configuration of minimizing the loss maximum value for each element wire conductor.

In the present embodiment, the transposition pitch can be determined to be larger than that in the prior art. In particular, in the modification of FIG. 2, the transposition pitch of the smallest pitch portion can be determined to be greater than that in the conventional technique. This fact is advantageous from a manufacturing aspect. In the step of twisting and assembling the element wire conductors at the time of manufacture of the electric rotating machine, a danger of damaging the insulation of the element wire conductor is reduced. Furthermore, a danger such as short-circuiting between element wire conductors is reduced, and there can be provided an electric rotating machine with higher reliability.

Figure 27:
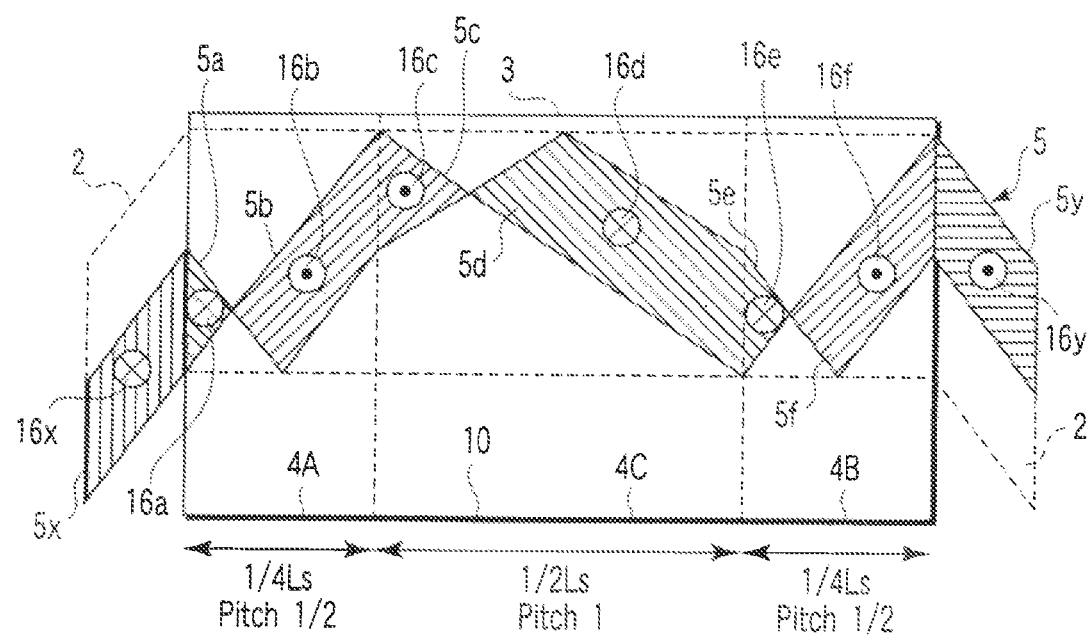
FIG. 27 is a schematic view showing a basic configuration of a second example of a twisted element wire conductor (in the case of a 540-degree transposition) of a prior art electric rotating machine.
Figure 28:
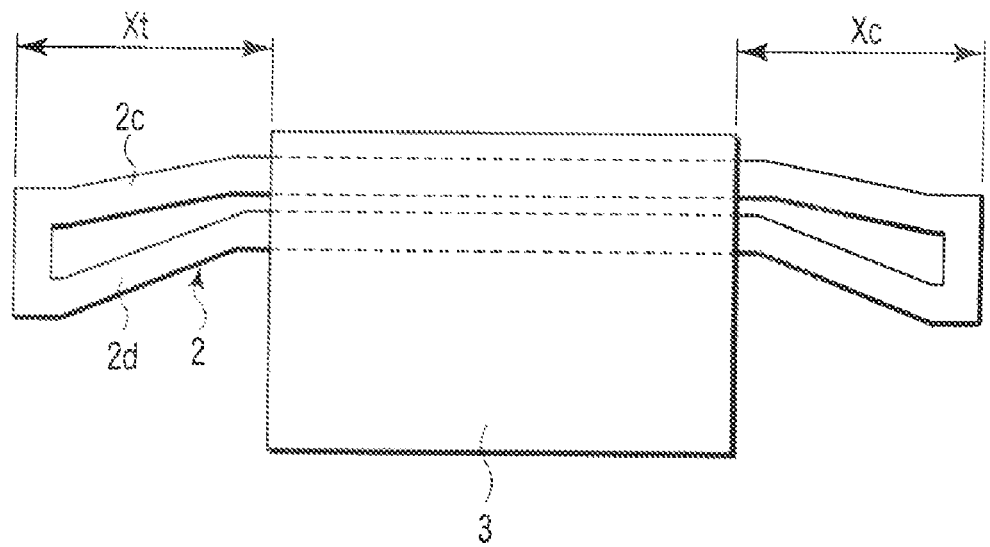
FIG. 28 is a schematic view for explaining problems with the stator of the prior art electric rotating machine of FIG. 27, wherein a stator core is cut along its axial direction.
Figure 29:
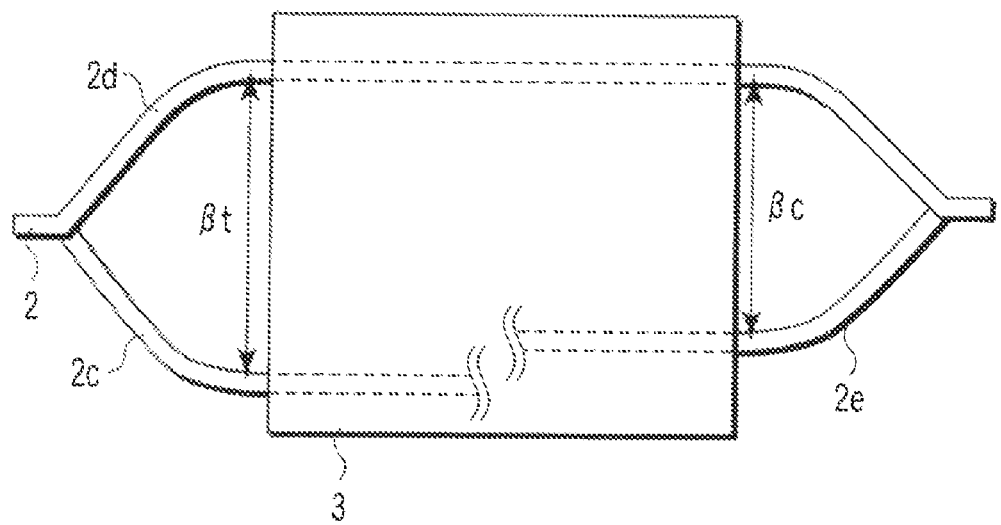
FIG. 29 is a schematic view for explaining problems with the stator of the prior art electric rotating machine of FIG. 27, wherein a stator core is exploded along its peripheral direction.

FIG. 2 shows an example in which the point of inflection of transposition pitches is identical to that in the prior art shown in FIG. 27, the transposition pitches Pb of both ends of the stator core 3 (border zones 4A and 4B of the stator core) is set at ½ and the transposition pitch Pm of the middle zone 4C of the stator core 3 is set at 1. The first embodiment including the case of FIG. 1 and the case of the modification of FIG. 2 is not limited to equalizing either the point of inflection of the transposition pitch or a ratio of the middle zone transposition pitch Pm to those Pb in the border zones 4A and 4B at both ends of the core 3 as in the cases of the prior art. A combination of distribution of a transposing angle or transposition pitches may be changed without deviating from the gist of the present invention.

Second Embodiment

Next, a second embodiment according to the present invention will be described with reference to FIG. 7. A description is omitted with respect to the constituent elements similar to those shown in FIG. 1.

In an element wire conductor 5, a 180-degree transposition is made in the range of ¼Ls on the left end border zone 4A of a stator core 3, and further, a 180 degree transposition is made in the range of ½Ls at the middle zone 4C. Furthermore, the transposing angle A in the range of ¼Ls at the right end border zone 4B is greater than 180 degrees, and is set at 190 degrees, for example.

In the first embodiment, the transposing angle of the left end border zone (core border zone 4A) of the stator core 3 is smaller than 180 degrees. In the second embodiment of FIG. 7, the transposing angle of the right end part (core border zone 4B) of the stator core 3 is set to be greater than 180 degrees in turn. With such a configuration, an interlinking magnetic flux 16e is reduced while an interlinking magnetic flux 16f is increased, whereby the generation of the unbalanced voltages can be suppressed. While the figure shows that an interlinking magnetic flux 16y at the right external end part is also reduced, in general, however, the increment of the interlinking magnetic flux 16f in the core 3 is greater than the decrement of the interlinking magnetic flux 16y at the external end part.

Figure 7:
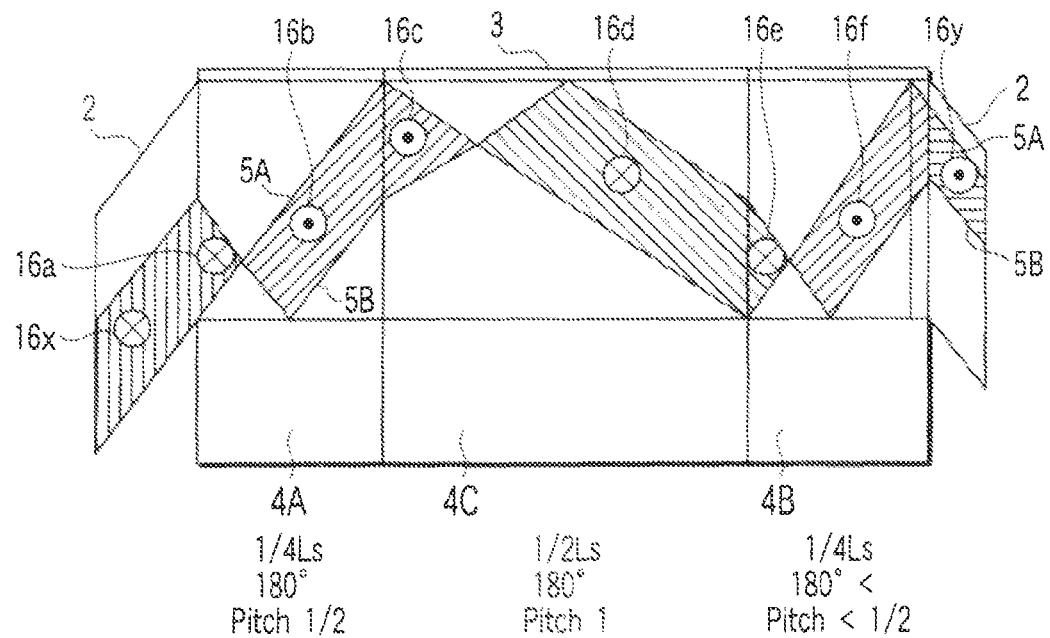
FIG. 7 is a view showing a basic structure of a second embodiment of the present invention.
Figure 8:
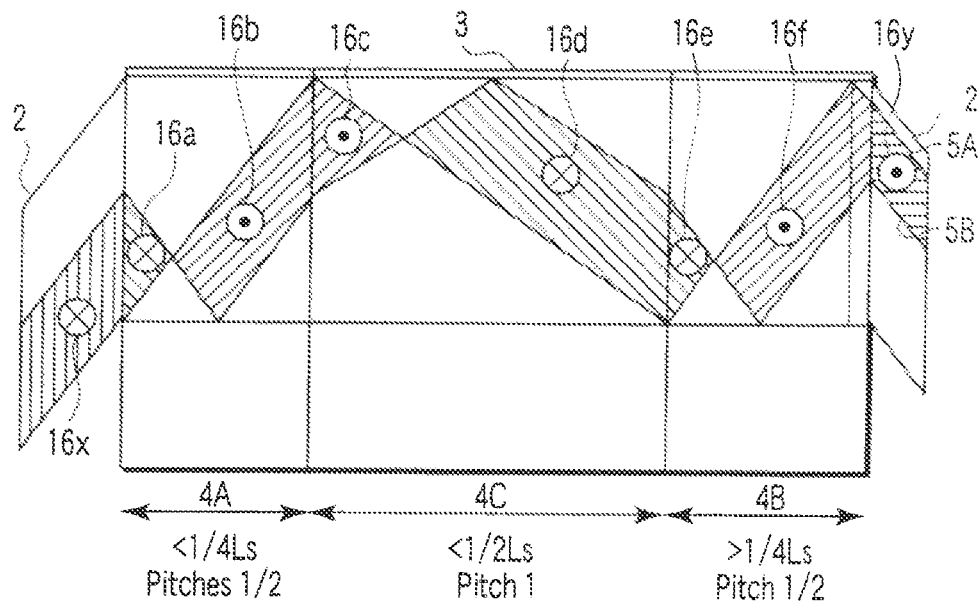
FIG. 8 is a view showing an exemplary modification of the basic structure of the second embodiment of the present invention.

FIG. 8 shows a modification of the second embodiment shown in FIG. 7, and a description is omitted with respect to constituent elements similar to those of FIG. 7.

In FIG. 8, the transposition pitches in the border zones 4A and 4B are identical at both ends of the core 3. Namely, in the case of FIG. 7, the transposition pitches of the element wire conductor is of three types: assuming that the pitches are 1 at the middle zone, the pitches are 0.5 at the left border zone 4A of the core 3 and less than 0.5 at the right border zone of the core 3. On the other hand, in the case of FIG. 8, there are only two types, i.e., one pitch in the middle zone 4C and the other pitch in each of the border zones 4A, 4B. In this manner, the position of the point of inflection in transposing pitches is more middle side than ¼Ls from an end at the illustrative right side and is more end part side than ¼Ls from an end at the left side of the core 3. Functions capable of reducing the unbalanced voltage at an element wire conductor pair is similar to that of FIG. 7.

Figure 9:
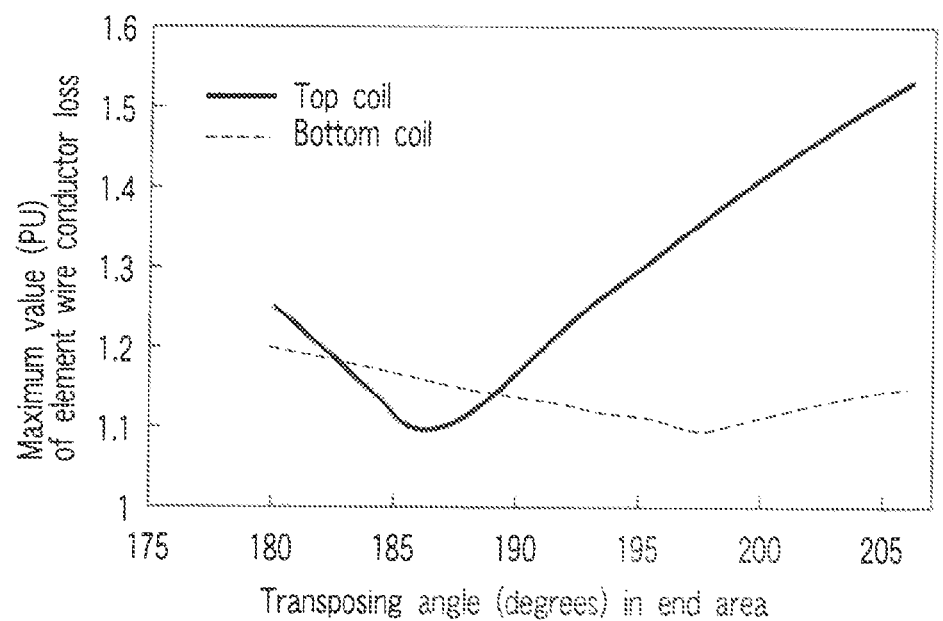
FIG. 9 is a view showing a relationship between a transposing angle and a maximum loss value at an end part zone of an element wire conductor by way of the numeric analysis in the second embodiment of the present invention.

FIG. 9 shows a transposing angle of a core border zone 4A in which an element wire loss maximum value becomes minimal, while the transposing angle of an end part zone is taken on an abscissa and an element wire loss maximum value is taken on an ordinate, obtained by way of numeric analysis similar to that described previously. This case shows a result of calculation when the interlinking magnetic flux quantity at one end part winding is 0.8 times of that at the other end part winding. As shown in FIG. 9, the transposing angle at which the loss maximum value becomes minimal is set at about 187 degrees in the top coil, whereas the transposing angle is set at about 198 degrees in the bottom coil. In other words, the transposing angles are different between the top and bottom coils. As in FIG. 9, the transposing angle of an optimal core border zone changes depending on the incident magnetic flux difference between both ends, and it is suggested that the optimal element wire conductor transposition is different between the top coil and the bottom coil.

Figure 10:
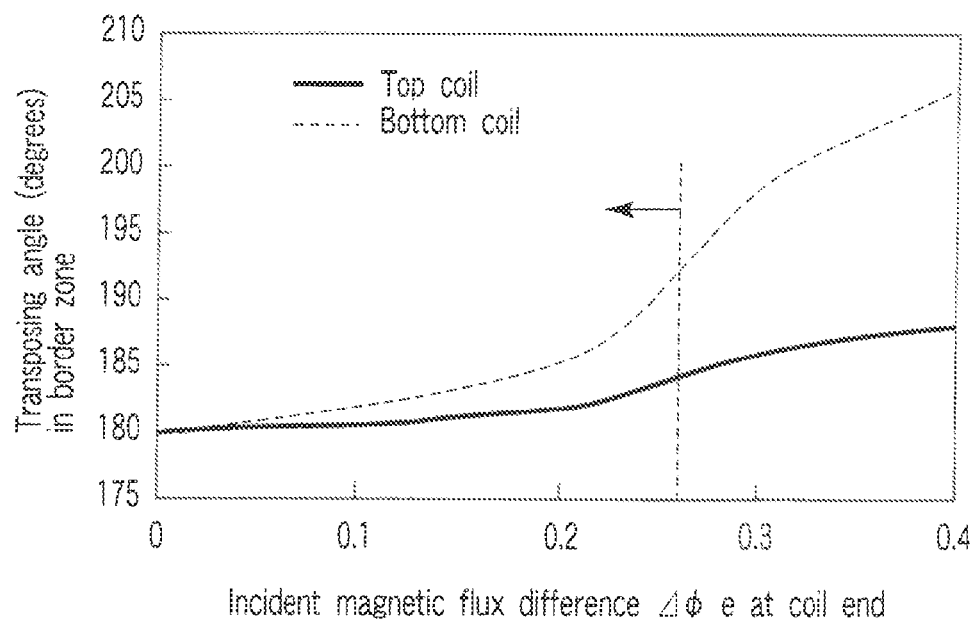
FIG. 10 is a view showing a transposing angle at which a maximum loss value by way of a numeric analysis in the first embodiment of the present invention becomes minimal.
Figure 11:
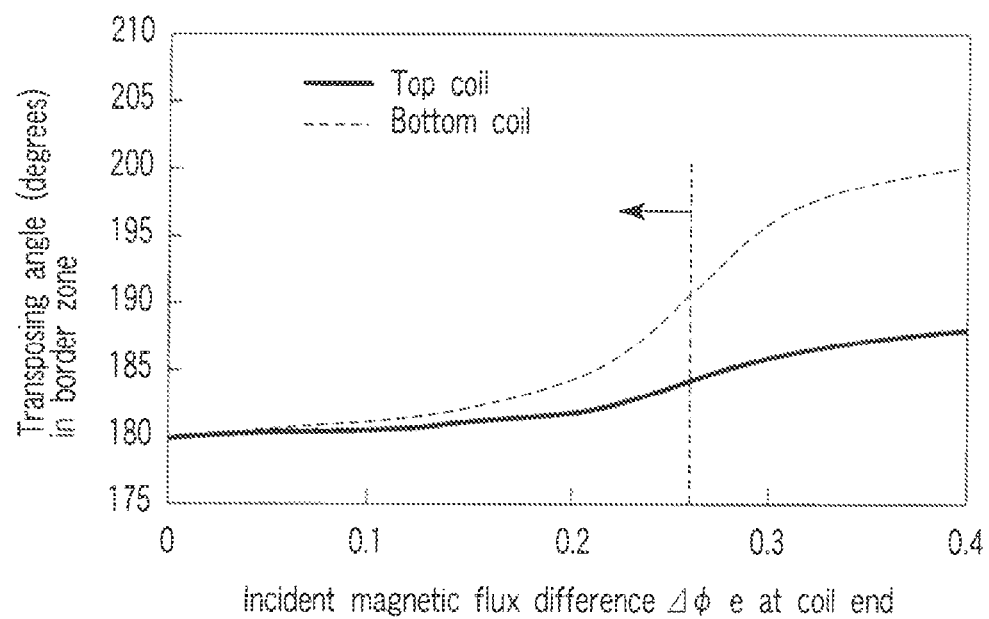
FIG. 11 is another view showing a transposing angle at which a maximum loss value by way of a numeric analysis example in the first embodiment of the present invention becomes minimal.

In addition, FIGS. 10 and 11 each show an example in which a ratio of incident magnetic flux to windings at both ends is taken on an abscissa, and a transposing angle at which a loss maximum value becomes minimal (hereinafter, referred to as an optimal transposing angle) is taken on an ordinate. FIG. 10 is equivalent to FIG. 7, in which the position of the transposing pitch inflection point is identical to that in the prior art. FIG. 11 is equivalent to FIG. 8, in which the transposing pitches in the proximity of both ends are identical to each other. In FIGS. 10 and 11 both, the greater the difference in incident magnetic flux is, the smaller the optimal transposing angle is. In addition, the optimal transposing angles are different between the top coil and the bottom coil.

A difference in the incident magnetic fluxes between both ends depends on a variety of design conditions or operating conditions. In an electric rotating machine such as ordinary turbine power generator, the magnetic flux difference can be in the range equivalent to 0 to 0.3 of the incident magnetic flux difference $\Delta\Phi$ of the present embodiment. Thus, when the transposing angle A of the end part zone is in the range of 180 degrees<A<200 degrees, the unbalanced voltage can be well reduced. Although this numeric calculation shows a result of the case of specific design, an approximately similar tendency occurs in equipment such as a turbine power generator having a large capacity to which a 540-degree transposition is applied.

As in the first embodiment, a transposing configuration of minimizing a loss maximum value is separately determined for each of the top and bottom coils or element wire conductors, thereby making it possible to reduce an unbalanced voltage more efficiently.

In the second embodiment, unlike the first embodiment, the pitches of an element wire conductor transposition are smaller than those in the prior art. Although the second embodiment is not advantageous from a manufacturing aspect, advantageous effect is attained for reducing an unbalanced voltage, and the method is suitable for an electric rotating machine having a comparatively long axial length of a stator core.

Third Embodiment

Figure 12:
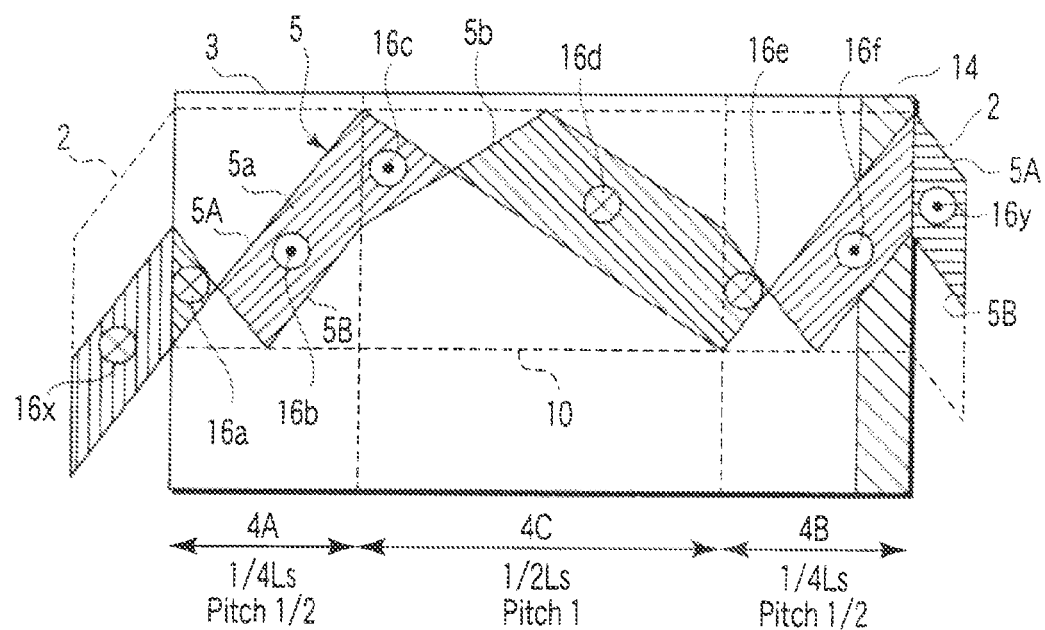
FIG. 12 is a view showing a basic structure of a third embodiment of the present invention.
Figure 13:
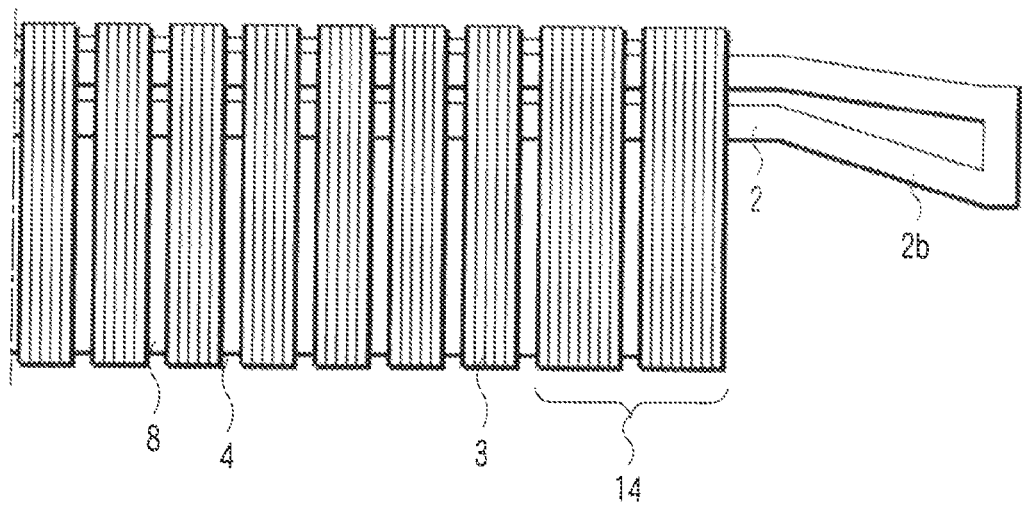
FIG. 13 is a partial sectional view of a stator of an electric rotating machine in the third embodiment of the present invention.

Next, a third embodiment according to the present invention will be described with reference to FIGS. 12 to 13. FIG. 12 is a view showing a relationship between an element wire conductor 5A and an interlinking magnetic flux 16a to 16f, 16x and 16y. FIG. 13 shows a side view of a configuration in which a conventional stator core is provided with a subsidiary core portion 14 and a ventilation duct 4 in a stator core 3.

The subsidiary core portion 14 is provided at the illustrative right end part of the stator core 3 such that a core space factor of the portion 14 is greater than those of other stator core portions. An element wire conductor 5A is continuously twisted toward the extension direction of a wiring slot 10 and is formed so as to be transposed at 540 degrees at an active portion in the wiring slot 10. The element wire conductor 5A and the other conductor 5B forming a conductor pair is short-circuited at both sides of an armature winding 2 that protrudes to the outside from both side faces of the stator core 3.

The core space factor used here denotes a ratio of a net of the core 14 to that of the entire core 3. The term "net" used here is a core per se excluding a substance such as an insulation material formed on a surface of an iron plate that configures the core in a stacked manner.

In the thus configured third embodiment, a current flows through the armature winding 2 at the time of a load operation, and the current branches and flows in the element wire conductors 5.

FIG. 12 shows magnetic fluxes interlinking two typical element wire conductor portions in the conductors 5A and 5B. It is assumed that the element wire conductor 5S is positioned at the innermost diameter side (near the rotor at an upper side of the stator 3) at the right end of the core 3, and the element wire conductor portion 5B is positioned at the middle portion in a vertical direction in the slot 10 at the right end of the core 3.

In the case where the interlinking magnetic flux for the armature winding 2 at the right end of the core 3 is smaller than the interlinking magnetic flux at the left side of the core 3, the magnetic flux quantity oriented upward of a paper face is smaller than that orienting downward of the paper face in a conventional 540-degree transposition method. However, the subsidiary core portion 14 having a large core space factor is provided at the right end of the core 3, so that an interlinking magnetic flux 16f is greater in comparison with the conventional 540-degree transposition. This compensates for the decrement of the interlinking magnetic flux in 16y, whereby the unbalanced voltage can be reduced.

Figure 14:
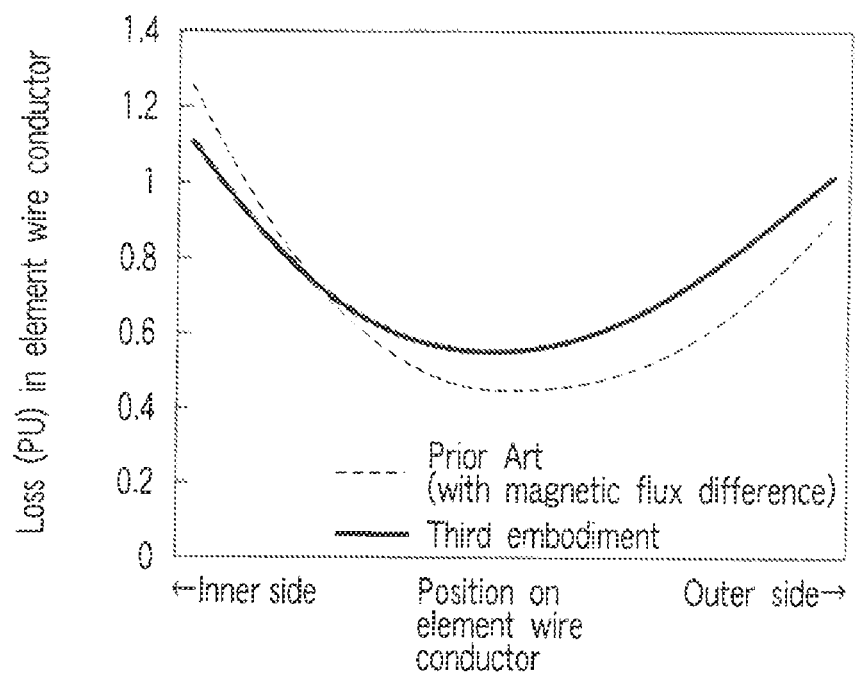
FIG. 14 is a view showing a loss distribution in an element wire conductor by way of a numeric analysis in the third embodiment of the present invention.

FIG. 14 is a view comparatively showing a loss distribution (PU) of element wire conductors in the third embodiment and the prior art obtained by means of numeric analysis similar to that described previously. It is found that the loss distribution is averaged, and the maximum value of the loss is reduced.

In the meantime, in the third embodiment, as shown in FIG. 13, a difference in core space factor is caused by a difference in pitches of the ventilation duct 4. In other words, the stacked thickness of a punched iron plate 6 between the ventilation ducts 4 is varied. By so doing, the widths of the ventilation ducts 4 can be made uniform. Thus, inside spacing pieces 8 can be composed of the same dimensioned material, and at the same time, the ventilation resistance between the ventilation ducts 4 can be equalized. Further, control of the air quantity distribution in the ventilation section is facilitated, thus making it possible to better cool the stator core 3 or the armature winding 2.

Figure 15:
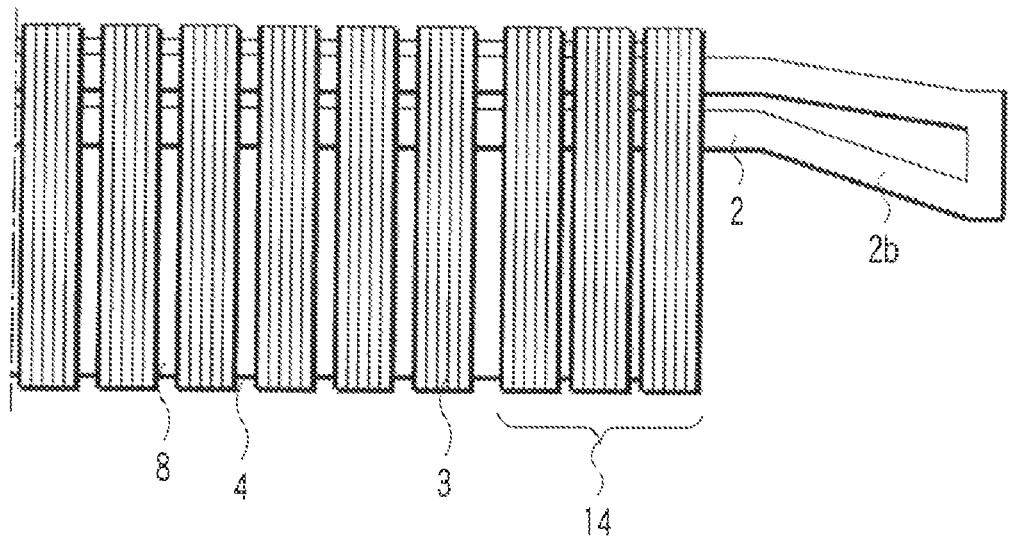
FIG. 15 is a partial sectional view of a stator in modification 1 of the third embodiment of the present invention.

Now, a first modification of the third embodiment of the present invention will be described with reference to FIG. 15. FIG. 15 shows a configuration of a subsidiary core portion 14 and a ventilation duct 4 in the proximity of an end part of a stator core 3. In the subsidiary core portion 14 of which a core space factor is greater than those of other portions, the width of the ventilation duct 4 becomes small. With such a configuration, lamination can be carried out without increasing the thickness of every units of the laminated core portion 14 between the ventilation ducts 4, and the core can be efficiently cooled.

Figure 16:
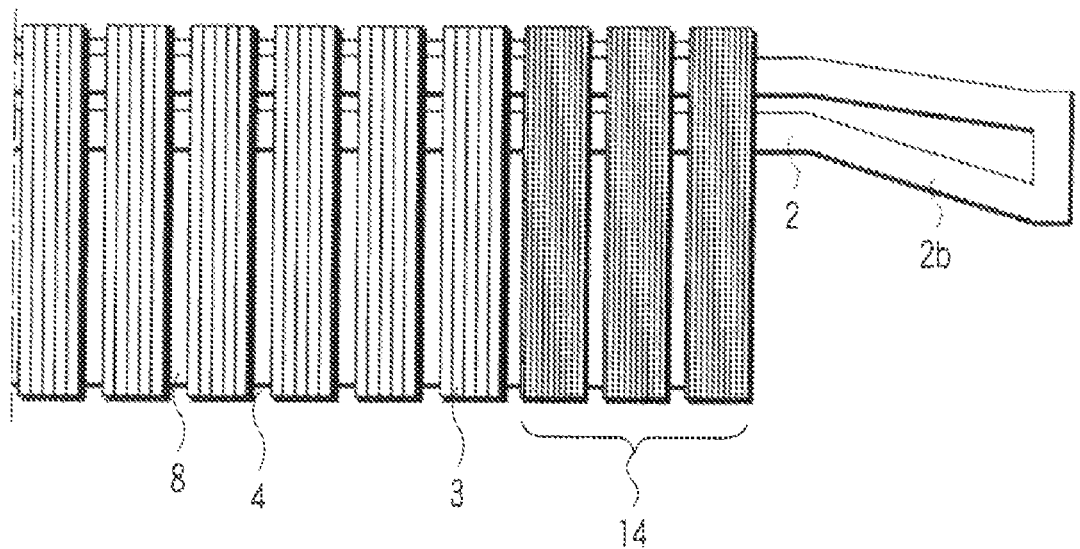
FIG. 16 is a partial sectional view of a stator in modification 2 of the third embodiment of the present invention.
Figure 17:
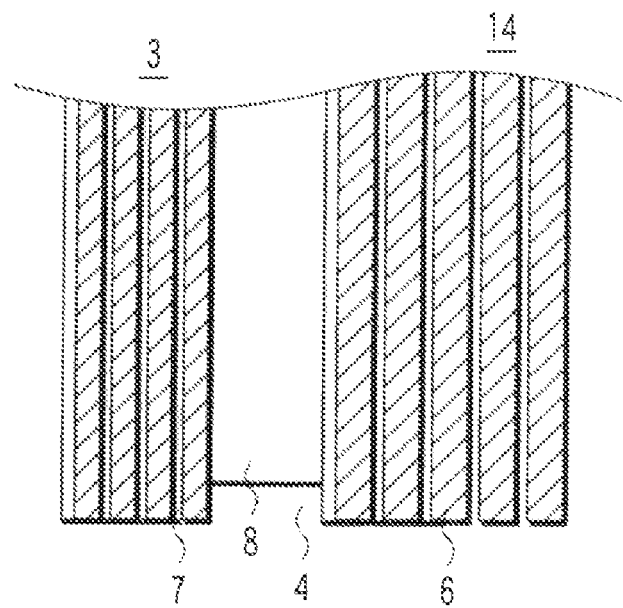
FIG. 17 is a partial sectional view of a stator in modification 3 of the third embodiment of the present invention.

Next, second and third modifications of the third embodiment of the present invention will be described with reference to FIGS. 16 and 17. FIG. 16 shows a configuration of a subsidiary core portion 14 and a ventilation duct 4 in the proximity of an end of a stator 3. As shown in FIG. 16, the punched iron plate in the subsidiary iron core 14 is made thinner than the punched iron plate in the core body 3. FIG. 17 shows an enlarged view of the core portion in the third modification. On the other hand, the punched plate 6 in the subsidiary core 14 shown in FIG. 17 is thicker than that in the core body 3, while an insulation film 7 such as insulation varnish film applied to a surface of the punched iron plate 6 and on a surface of the plate in the core body 3 have the similar thickness, for example. In the second and third modifications of the third embodiment of the present invention, a difference in core space factor is composed of a difference in ratio of thickness in the punched iron plate 6 and the plate in the core body 3 and the insulation film 7 configuring the stator core 3.

With the thus configured electric rotating machine, the subsidiary core portion 14 can be formed without varying the configuration of the ventilation duct 4. Thus, the degree of freedom in ventilation design increases, enabling more efficient ventilation. At the same time, when the thickness of the insulation film 7 is made uniform in the whole core 3, a portion at which a core space factor is small is composed of a thinner punched plate. An eddy current loss exerted by an in-plane magnetic flux interlinking the punched thin plate can be relatively reduced, thus making it possible to suppress a temperature rise at this core portion.

Next, a fourth modification of the third embodiment of the present invention will be described with reference to FIG. 18. FIG. 18 shows a configuration of a subsidiary core portion 14 and a ventilation duct 4 of a stator core 3. A spacer piece 8 for forming the ventilation duct 4 of the stator core 3, in general, is mounted in advance on a spacer piece mount plate 9a and 9b each formed in the same shape as the punched iron plate 6, and then, is inserted at a predetermined interval between the portion 14 at the time of assembling of the stator core 3. In FIG. 18, in the subsidiary core portion 14, the permeability of the spacer piece mount plate 9b is set to be higher than those of other portions in the core body 3. This is achieved by providing a magnetic member at the subsidiary core portion 14 and providing a nonmagnetic member at other portions in the core body 3.

With such a configuration shown in FIG. 18, as in the second modification of FIG. 16, the subsidiary core portion 14 can be formed without varying the configuration of the ventilation duct 4. Thus, the degree of freedom in ventilation design increases, enabling more efficient ventilation. In addition, a stator core 3 can be fabricated in accordance with processes similar to conventional processes except for changing a material of the spacer piece mount plate 9a, 9b. Thus, there is an advantage that a manufacturing process is not complicated.

Next, a fifth modification of the third embodiment of the present invention will be described with reference to FIG. 19. FIG. 19 shows a configuration of a subsidiary core portion 14 and a ventilation duct 4 of a stator core 3.

An element wire conductor 5A of an armature winding 2 is continuously twisted toward the extension direction of a winding slot 10 and is formed to be transposed at 540 degrees, at a portion stored in the winding slot 10. The element wire conductors 5A and 5B are short-circuited at both ends of the armature winding 2 that protrudes to the outside from both side faces of the stator core 3. The element wire conductors 5A and 5B have a point of inflection of transposition pitches at a distance of ¼Ls of a stator core length Ls from both ends, and provides a subsidiary core portion 14 of which an core space factor is greater than those of other stator iron portions is provided in the stator core 3 in the proximity of the point of inflection at the left side of the core 3 in the figure.

In the thus configured fifth modification, a current flows through an armature winding at the time of a load operation, and a current branches and flows through element wire conductors. FIG. 12 described previously shows magnetic fluxes interlinking between two typical element wire conductors 5A and 5B. It is assumed that the element wire conductor 5A is positioned at the innermost diameter side (near a rotor at upper side of the figure) at the right end of the core 3, and the element wire conductor 5B is positioned at the middle part in the vertical direction in the slit 10 at the right end of the core 3. In the case where the interlinking magnetic flux for the armature winding 2 at the right end of the core is smaller than the interlinking magnetic flux at the left side of the core, the magnetic flux quantity oriented upward of a paper face is smaller than that oriented downward of the paper face in a conventional 540-degree transposition. However, a subsidiary core portion 14 having a large core space factor is provided in the proximity of a point of inflection of the element wire conductor 5A at the left side of the core 3, so that the interlinking magnetic flux 16b or 16c becomes great in comparison with a conventional 540-degree transposition. This compensates for the decrement of a magnetic flux in interlinking magnetic flux 16y, thereby making it possible to reduce an unbalanced voltage.

This fact can be explained by comparison with the third embodiment of the present invention described in FIG. 12. In other words, in a 540-degree transposition, considering that the 540-degree transposition is divided by a transposing angle of 180 degrees of the element wire conductor 5A from an core end, the shape of a zone surrounded by an element wire pair and the orientation of the interlinking magnetic fluxes are identical to each other in the 180-degree zones at both ends. In FIG. 12, a portion 16f at which a magnetic flux is strengthened by means of the subsidiary core portion 14 is equivalent to a portion 16b of FIG. 19. Thus, if a subsidiary core portion 14 is provided at a right end portion of the interlinking magnetic flux zone 16b, a function similar to that of FIG. 12 is obtained. In addition, the subsidiary core portion 14 is provided also at a portion of an interlinking magnetic flux 16c in FIG. 19, whereas a magnetic flux for inducing a negative voltage equal to that of 16b interlinks at 16c in the element wire pair of the figure. Strictly, there exists an element wire conductor pair at which the interlinking magnetic flux of a portion equivalent to the flux 16c induces a negative voltage opposite to the interlinking magnetic flux of a portion equivalent to 16b (for example, in the case where the element wire conductor pairs cross at a position of ¼Ls). However, a small number of element wire conductor pairs exists, and thus, as a whole, even if a subsidiary core portion 14 is included, similar advantageous effect can be attained. An unbalanced voltage can be reduced by providing a subsidiary core portion 14 roughly in the proximity of a point of a pitch inflection.

Fourth Embodiment

Figure 20:
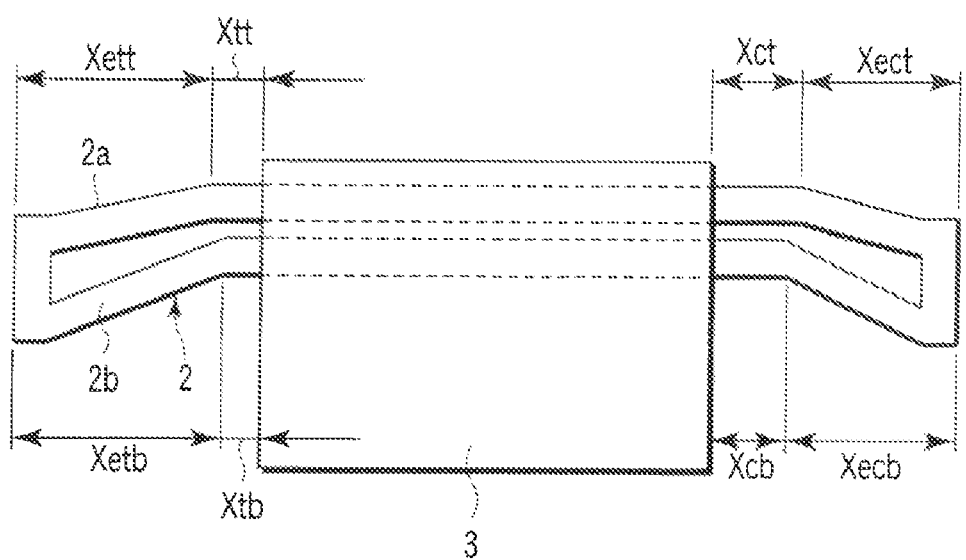
FIG. 20 is a view showing a basic structure of a stator of an electric rotating machine of a fourth embodiment of the present invention.

Next, a fourth embodiment according to the present invention will be described with reference to FIG. 20. FIG. 20 shows configurations of a stator core 3 and an armature winding 2. In FIG. 20, although not shown, a 540-degree transposition is applied to the element wire conductor of the armature winding 2. The armature winding 2 protrudes from an end of the stator core 3 and forms a so-called involute structure such that the winding is bent after it has protruded linearly at a predetermined distance from both ends of the core 3. The magnetic fluxes interlinking at the end of the armature winding 2 are different from each other between the right and left side ends of the core 3. With respect to the top coil 2a, the interlinking magnetic flux in the range of Xect is smaller than that in the range of Xett. With respect to the bottom coil 2b, the interlinking magnetic flux in the range of Xecb is smaller than that in the range of Xetb. A distance in the linear portion Xct and Xcb in the top and bottom coils 2a and 2b protruding from the end of the stator core 3 in the right side of the core 3 is different in the corresponding length in the left side end of the core 3. In this case, assuming that the distance Xtt in the linear portion of the top coil 2a at the left side and Xct at the right side, and with respect to the bottom coil 2b, the distance is Xtb at the left side and Xcb at the right side of the core 3, the following relationship is established:

Xtt<Xct
Xtb<Xcb

With the thus configured stator 3, with respect to the element wire conductor of the top coil 2a of the armature winding 2, if a difference in length between Xct and Xtt is set at an appropriate value, a sum of the interlinking magnetic fluxes of the Xct portion and the Xect portion can be made substantially equal to a sum of the interlinking magnetic fluxes of the Xtt portion and the Xett portion, thereby making it possible to reduce an unbalanced voltage in the element wire conductor.

Figure 21:
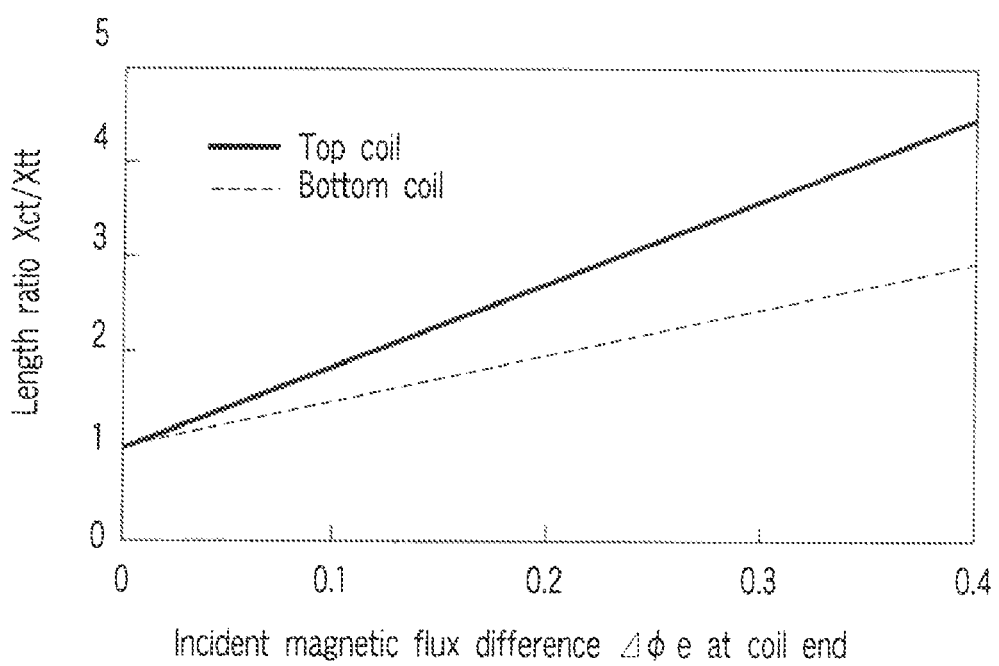
FIG. 21 is a view for explaining a linear part length ratio of element wire conductors for reducing a loss in the armature winding in the fourth embodiment of the present invention.

FIG. 21 shows a ratio Xct/Xtt of lengths of end linear portions at which a loss maximum value becomes minimal while a ratio of incident magnetic fluxes for windings at both ends is taken on an abscissa, by means of numeric analysis similar to that described previously.

Although a difference in the incident magnetic fluxes at both ends depends on a variety of design conditions or operating conditions, the difference can be in the range equivalent to 0 to 0.3 of the incident magnetic flux difference ΔΦe of the present embodiment in an electric rotating machine such as ordinary turbine-driven electric power generator. Thus, when the ratio Xct/Xtt of lengths of the end linear portions is 1<Xct/Xtt<3.5, an unbalanced voltage can be well reduced. A specific value can be obtained by means of numeric calculation under a design condition for each electric rotating machine. Although this numeric calculation is a result of the case of a specific design, an approximately similar tendency occurs in equipment such as a turbine power generator having a large capacity to which a 540-degree transposition is applied.

As in the first embodiment, a ratio of lengths of end linear portions for minimizing a loss maximum value is separately determined for each of the top coil and the bottom coil, thereby making it possible to reduce an unbalanced voltage more efficiently.

Fifth Embodiment

Figure 22:
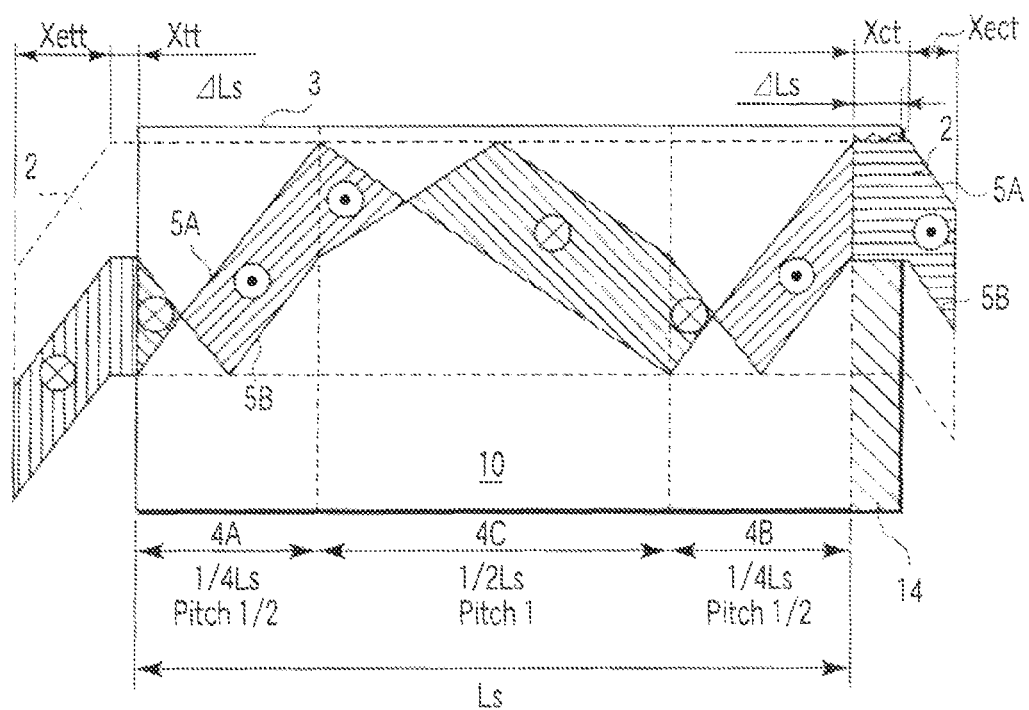
FIG. 22 is a view showing a basic structure of a part of a stator in an electric rotating machine of a fifth embodiment of the present invention.

Next, a fifth embodiment of the present invention will be described with reference to FIG. 22. Like FIG. 1, FIG. 22 shows a position of a typical element wire conductor of one of the top and bottom coils. A description is omitted with respect to the configuration similar to that of FIG. 1. In the element wire conductor 5, a 540-degree transposition similar to that of the prior art is made in the range of a length Ls in the axial direction of a stator core 3, the ends of the conductor 5A are bent via linear portions each protruding at its outside at a predetermined distance, and forms a so called involute portion structure. In FIG. 22, the interlinking magnetic flux quantities at the ends of the armature winding 2 represent a state in which the quantity at the right side is smaller than that at the left side of the core 3. The lengths of the linear portions that are outside the range of axial length Ls are Xtt at the left side and Xct at the right side of the core 3. A subsidiary core portion 14 of a length ΔLs made of a punched iron plate having a configuration similar to that of the stator core 3 is provided at the right end of the stator core 3. Effectively, the axial length of the stator core 3 becomes at Ls+ΔLs.

With the thus configured electric rotating machine, among the range of Xct of the end linear portion of the armature winding 2, the interlinking magnetic flux increases at a portion of ΔLs at which the subsidiary core portion 14 exists. Thus, a sum of the interlinking magnetic fluxes of the Xct portion and the Xect portion can be made substantially equal to a sum of the interlinking magnetic fluxes of the Xtt portion and the Xett portion, and an unbalanced voltage in the element wire conductor pair can be reduced.

In this case, the length of the Xct portion according to the FIG. 22 embodiment can be reduced in comparison with the case of FIG. 20 in which a subsidiary core portion does not exist. Thus, the full length of the armature winding 2 in the FIG. 22 embodiment, the axial length of the entire electric rotating machine, can be reduced. Therefore, a more compact electric rotating machine can be provided.

Figure 23:
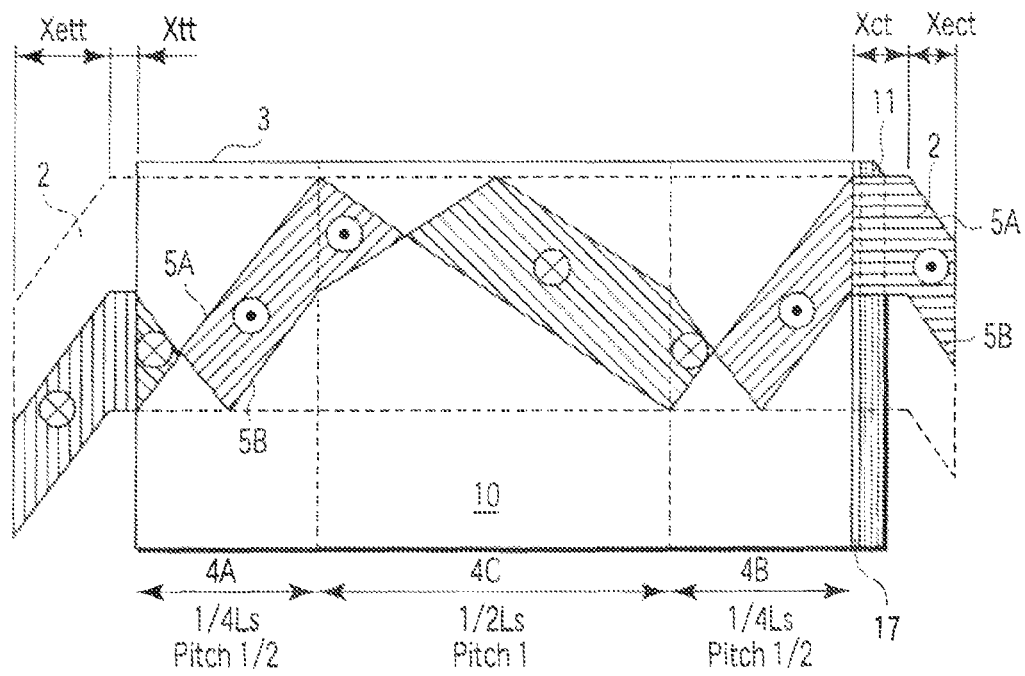
FIG. 23 is a view showing a basic structure of a part of a modification 1 of a stator in the electric rotating machine according to the fifth embodiment of the present invention.
Figure 26:
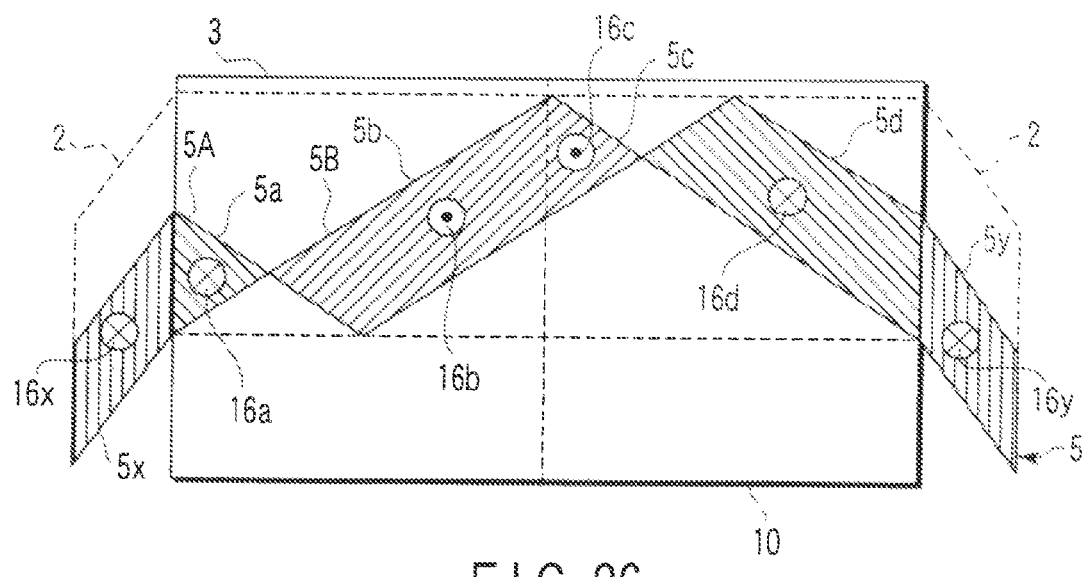
FIG. 26 is a schematic view showing a basic configuration of a first example of a twisted element wire conductor (in the case of a 360-degree transposition) of a prior art electric rotating machine.

Next, a first modification of the fifth embodiment of the present invention will be described with reference to FIG. 23. A description is omitted with respect to a configuration similar to that of FIG. 22. In FIG. 23, a magnetic flux shunt 11 composed of stacked iron plates is provided for shielding the magnetic flux via a plurality of bar-like spacer pieces 17, at the outside of the right end of the stator core 3.

With the thus configured electric rotating machine, among the range of Xct of the end linear portion of the armature winding 2, an interlinking magnetic flux increases at a portion at which the magnetic flux shunt 11 exists. Thus, a sum of the interlinking magnetic fluxes of the Xct portion and the Xect portion can be made equal to a sum of the interlinking magnetic fluxes of the Xtt portion and the Xett portion, and an unbalanced voltage in element wire conductor can be reduced.

In addition, the length of the Xct portion can be reduced in comparison with a case of FIG. 20 in which a subsidiary core portion does not exist. Thus, the full length of the armature winding 2, namely, the axial length of the entire electric rotating machine can be reduced. Therefore, a more compact electric rotating machine can be provided.

The magnetic flux shunt 11, in general, is provided for shielding an external magnetic flux incident in the axial direction to the end of the stator core 3, and reducing an eddy current loss at the stator core 3 end. The magnetic flux shunt 11 is often composed of the same material as that for the stator core 3. However, in the present embodiment, it can be considered that this shunt mainly has a function of adjusting the magnetic flux quantity interlinking at the armature winding bar (also referred to as a coil bar, a winding bar, or a multiple element wire conductor), and is included in the subsidiary core portion 14 shown in FIG. 22 of the fifth embodiment described above. In the first modification of the fifth embodiment shown in FIG. 23, since the outside spacer pieces are installed at the inside of the magnetic flux shunt for fixing the stator core 3, it is possible to increase the structural reliability of the stator core 3.

Next, a second modification of the fifth embodiment of the present invention will be described with respect to FIG. 24. A description is omitted with respect to the configuration similar to that of FIG. 23. In FIG. 24, at both of the outsides of the stator core 3, magnetic flux shunts 11A and 11B composed of stacked iron plates are mounted via a plurality of bar-like spacer pieces 17A and 17B, respectively, for example. The thickness D2 of the magnetic flux shunt 11B at the right side is greater than that D1 of the shunt 11A at the left side of the core 3.

With the thus configured electric rotating machine, among the range of Xct of the right end linear portion of the armature winding 2, the interlinking magnetic flux in the right end at which the thick shunt 11B is provided increases more significantly than that in the left side. Thus, a sum of the interlinking magnetic fluxes of the Xct portion and the Xect portion can be made substantially equal to a sum of the interlinking magnetic fluxes of the Xtt portion and Xett portion. Therefore, an unbalanced voltage in the element wire conductor pair can be reduced.

In this case, the magnetic flux shunts 11A and 11B are provided at both sides of the stator core 3. Thus, an eddy current loss can be reduced at the both ends of the stator core 3 while shielding the external magnetic fluxes incident from outside in the axial direction to the end of the stator core 3. Therefore, an electric rotating machine with more efficiency and high reliability can be provided.

In the embodiments shown in FIGS. 7, 8, 12, 19, 22, 23, and 24 respectively describe in a case where a point of inflection of transposition pitches is set to be identical to that of the prior art shown in FIG. 27, and the transposition pitches at both border zones of the stator core 3 is ½, and the transposing pitch of the middle zone of the stator core 3 is 1. However, the first embodiment is not limited to the case where the point of inflection of the transposition pitch or a ratio between each of the transposition pitches in the border zones and that in the middle zone as in the case of the prior art. A combination of the transposing angles or transposition pitches may be determined freely without deviating from the functions of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stator of an electric rotating machine, comprising:
    a stator core provided with a plurality of ventilation ducts in a radial direction and a plurality of winding slots in an axial direction; and
    an armature winding in which at least one armature winding bar is provided, the armature winding bar being composed of a plurality of element wire conductors stacked in each of the winding slots, respectively, the element wire conductors including one conductor having a twisted portion transposed toward an extension direction of the winding slots, at least two of the element wire conductors being short-circuited at both sides protruding outside from both side faces of the stator core, transposition pitches of the portion provided in both ends of the winding slot being different from that in a middle zone of the winding slot, and an entire transposing angle being approximately 540 degrees,
    wherein the armature winding bar has one end portion linearly protruding outside from one end of the winding slot and the other end portion having a linearly protruding length from the other end which is different from that of the one portion so as to reduce an unbalanced voltage generated between the element wire conductors, the voltage being generated at both ends of the winding due to a difference in magnetic fluxes interlinking at the element wire conductors.

2. The stator of an electric rotating machine according to claim 1,
    wherein, assuming that the one end portion of the armature winding bar linearly protruding outside from the winding slot of the armature winding has a length X2 which is longer than that X1 of the other end portion, the armature winding bar is set to have a ratio of X2 and X1 at $1 < X2/X1 \leq 3.5$.

3. An electric rotating machine, comprising:
    an armature winding of the electric rotating machine as recited in any one of claims 1 and 2;
    a stator core including a plurality of winding slots for storing the armature winding in an axial direction, and a plurality of ventilation ducts in a radial direction thereof; and
    a rotor which is arranged at an inner diameter side of the stator core with a rotary shaft rotatably supported on bearings.

* * * * *